United States Patent
Kim et al.

(10) Patent No.: US 11,432,087 B2
(45) Date of Patent: Aug. 30, 2022

(54) ELECTRONIC DEVICE COMPRISING WATER-REPELLENT STRUCTURE AND METHOD FOR OPERATING SAME

(71) Applicant: Samsung Electronics Co., Ltd., Gyeonggi-do (KR)

(72) Inventors: Hongki Kim, Gyeonggi-do (KR); Seonho Han, Gyeonggi-do (KR); Jin Kim, Gyeonggi-do (KR); Taegyun Kim, Gyeonggi-do (KR); Dongheon Jang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 35 days.

(21) Appl. No.: 16/961,850

(22) PCT Filed: Jan. 15, 2019

(86) PCT No.: PCT/KR2019/000584
§ 371 (c)(1),
(2) Date: Jul. 13, 2020

(87) PCT Pub. No.: WO2019/139449
PCT Pub. Date: Jul. 18, 2019

(65) Prior Publication Data
US 2020/0359145 A1    Nov. 12, 2020

(30) Foreign Application Priority Data

Jan. 15, 2018  (KR) .................. 10-2018-0005002

(51) Int. Cl.
*H04R 29/00*    (2006.01)
*G04G 17/08*    (2006.01)
(Continued)

(52) U.S. Cl.
CPC ........... *H04R 29/001* (2013.01); *G04G 17/08* (2013.01); *G04G 21/02* (2013.01); *G04G 21/06* (2013.01);
(Continued)

(58) Field of Classification Search
CPC ........ H04R 29/001; H04R 1/028; H04R 1/08; H04R 3/00; H04R 2499/11; G04G 17/00;
(Continued)

(56) References Cited

U.S. PATENT DOCUMENTS 9,363,587 B2    6/2016  Weiss et al.
2007/0047747 A1  3/2007  Yoshida et al.
(Continued)

FOREIGN PATENT DOCUMENTS

JP    2012039268    2/2012
JP    2013115549    6/2013
(Continued)

OTHER PUBLICATIONS

PCT/ISA/210 Search Report issued on PCT/KR2019/000584, dated Apr. 22, 2019, pp. 5.
(Continued)

*Primary Examiner* — Andrew L Sniezek
(74) *Attorney, Agent, or Firm* — The Farrell Law Firm, P.C.

(57) ABSTRACT

According to various embodiments, there may be provided an electronic device comprising: a housing comprising a first space connected to the outside of the electronic device; a speaker device arranged inside the housing; a speaker housing comprising a second space formed to be spatially separated from the inner space of the electronic device by the speaker device inside the housing, the second space being arranged to be connected to the first space; a first atmospheric pressure sensor which is exposed to the first
(Continued)

space and has a waterproofing function; a second atmospheric pressure sensor arranged in the inner space; and a processor, wherein the electronic device is configured to detect immersion of the electronic device in water or removal thereof from the immersion on the basis of the amount of atmospheric pressure change confirmed through the first atmospheric pressure sensor, and is configured to control the water-repellent operation through the speaker device on the basis of a difference value between first atmospheric pressure information acquired from the first atmospheric pressure sensor and second atmospheric pressure information acquired through the second atmospheric pressure sensor. Various other embodiments may be possible.

14 Claims, 21 Drawing Sheets

(51) Int. Cl.
G04G 21/02 (2010.01)
H04B 1/3827 (2015.01)
H04R 1/02 (2006.01)
H04R 3/00 (2006.01)
H04R 1/08 (2006.01)
G04G 21/06 (2010.01)
G10L 25/51 (2013.01)

(52) U.S. Cl.
CPC ............... *G10L 25/51* (2013.01); *H04B 1/385* (2013.01); *H04R 1/028* (2013.01); *H04R 1/08* (2013.01); *H04R 3/00* (2013.01); *H04R 2499/11* (2013.01)

(58) Field of Classification Search
CPC ........ G04G 21/02; G04G 21/06; G10L 25/51; H04B 1/385
See application file for complete search history.

(56) References Cited

U.S. PATENT DOCUMENTS

| 2013/0287213 | A1* | 10/2013 | Sekiyama | H04M 1/18 |
| | | | | 381/55 |
| 2015/0146905 | A1 | 5/2015 | Abe et al. | |
| 2015/0319534 | A1 | 11/2015 | Lippert | |
| 2016/0005296 | A1 | 1/2016 | Kil et al. | |
| 2016/0146935 | A1 | 5/2016 | Lee et al. | |
| 2016/0241945 | A1 | 8/2016 | Zadesky et al. | |
| 2016/0379605 | A1 | 12/2016 | Morobishi | |
| 2017/0089698 | A1 | 3/2017 | Ehman et al. | |

FOREIGN PATENT DOCUMENTS

| JP | 2017-175284 | 9/2017 |
| KR | 1020160004850 | 1/2016 |
| KR | 1020160063068 | 6/2016 |
| KR | 1020160089459 | 7/2016 |
| KR | 1020170091849 | 8/2017 |

OTHER PUBLICATIONS

PCT/ISA/237 Written Opinion issued on PCT/KR2019/000584, dated Apr. 22, 2019, pp. 4.
European Search Report dated Dec. 15, 2020 issued in counterpart application No. 19738071.0-1001, 8 pages.

* cited by examiner

ELECTRONIC DEVICE COMPRISING WATER-REPELLENT STRUCTURE AND METHOD FOR OPERATING SAME

PRIORITY

This application is a National Phase Entry of International Application No. PCT/KR2019/000584, which was filed on Jan. 15, 2019, and claims priority to Korean Patent Application No. 10-2018-0005002, filed in the Korean Intellectual Property Office on Jan. 15, 2018, the content of each of which is incorporated herein by reference.

TECHNICAL FIELD

Various embodiments of the disclosure relate to an electronic device including a water-repellent structure and an operating method thereof.

BACKGROUND ART

Electronic devices have become slimmer to meet consumers' purchasing needs as the disparity in function among manufacturers of electronic devices has been reduced, and have been developed to increase rigidity of electronic devices, to enhance design aspects, and simultaneously to provide differentiated functional elements.

According to various embodiments, the waterproof function of differentiated functional elements of electronic devices may be very important to portable electronic devices which are miniaturized and are easy to carry. In addition, there may be a solution for discharging water in an electronic device that is immersed in water.

DISCLOSURE OF INVENTION

Technical Problem

According to various embodiments, an electronic device may include at least one seal member disposed therein to implement a waterproof function. According to an embodiment, the seal member may be interposed between at least two components (for example, a bracket, a housing or a display module, etc.) of the electronic device, and may implement the waterproof function by sealing an inner space of the electronic device when the corresponding components are coupled to each other.

An electronic device may include at least one electronic component disposed to have at least a portion thereof exposed to the outside of the electronic device. According to an embodiment, the electronic device may include a space opened to the outside from the inside of the electronic device, and an electronic component disposed in the electronic device by using the corresponding space may perform a function corresponding to an external environment. According to an embodiment, the electronic component may include a speaker module, a microphone module, a temperature/humidity detection sensor, an atmospheric pressure sensor, an odor sensor, an interface connector port, or an earphone jack module. According to an embodiment, the electronic device may require a space opened to allow at least a portion of the electronic component to be exposed to an external environment, and the corresponding space may include a separate separation member (for example, a waterproof member, a seal member, etc.) applied to waterproofing.

However, when the electronic device is immersed in water, water may flow into the corresponding opened space, and, when the electronic device is immersed in water for a long time, water may permeate the separation member, which has a function of temporarily isolating from the external environment, or there may be water remaining in a surrounding space, and there may be a problem that the electronic device does not perform its own functions well. In particular, if the component includes a speaker module, there may be a problem that sound quality of the speaker is degraded due to water remaining in a speaker hole.

Various embodiments of the disclosure may provide an electronic device including a water-repellent structure and an operating method thereof.

Various embodiments of the disclosure may provide a device for detecting water and an operating method thereof.

Various embodiments of the disclosure may provide an electronic device including a water-repellent structure for removing water remaining inside the electronic device by using an existing component, and an operating method thereof.

Solution to Problem

According to various embodiments, there is provided an electronic device including: a housing including a first space connected with an outside of the electronic device; a speaker device disposed inside the housing; a speaker housing including a second space formed to be spatially separated from an inner space of the electronic device by the speaker device inside the housing, and disposed to connect the second space to the first space; a first atmospheric pressure sensor disposed to be exposed to the first space, and having a waterproof function; a second atmospheric pressure sensor disposed in the inner space; and a processor, wherein the processor is configured to detect immersion in water or immersion removal of the electronic device based on an atmospheric pressure change identified through the first atmospheric pressure sensor, and to control a water-repellent operation through the speaker device based on a difference value between first atmospheric pressure information obtained from the first atmospheric pressure sensor and second atmospheric pressure information obtained through the second atmospheric pressure sensor.

According to various embodiments, there is provided an operating method of an electronic device, the method including: identifying immersion in water through a first atmospheric pressure sensor disposed in a sound wave guide space connected with a speaker device of the electronic device to be exposed; identifying whether the immersion is removed through the first atmospheric pressure sensor when the immersion is identified; and discharging water remaining the sound wave guide space by operating the speaker device when the immersion is removed.

Advantageous Effects of Invention

Various embodiments of the disclosure effectively remove water remaining in a space, which is opened from the inside to the outside, after an electronic device is immersed in water, such that degradation of performance of electronic components can be prevented.

BEST MODE FOR CARRYING OUT THE INVENTION

Figure 1:
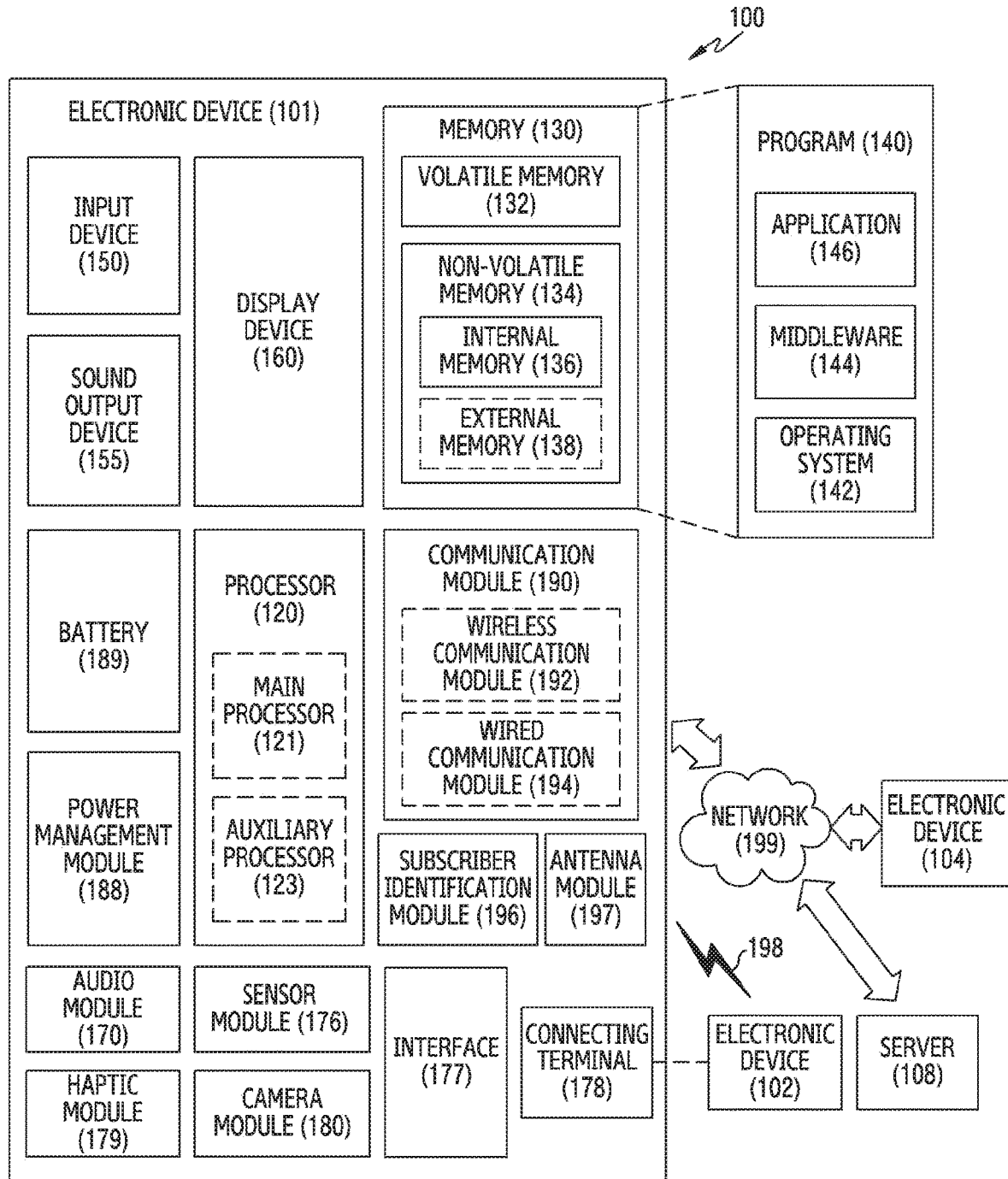
FIG. 1 is a block diagram of an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
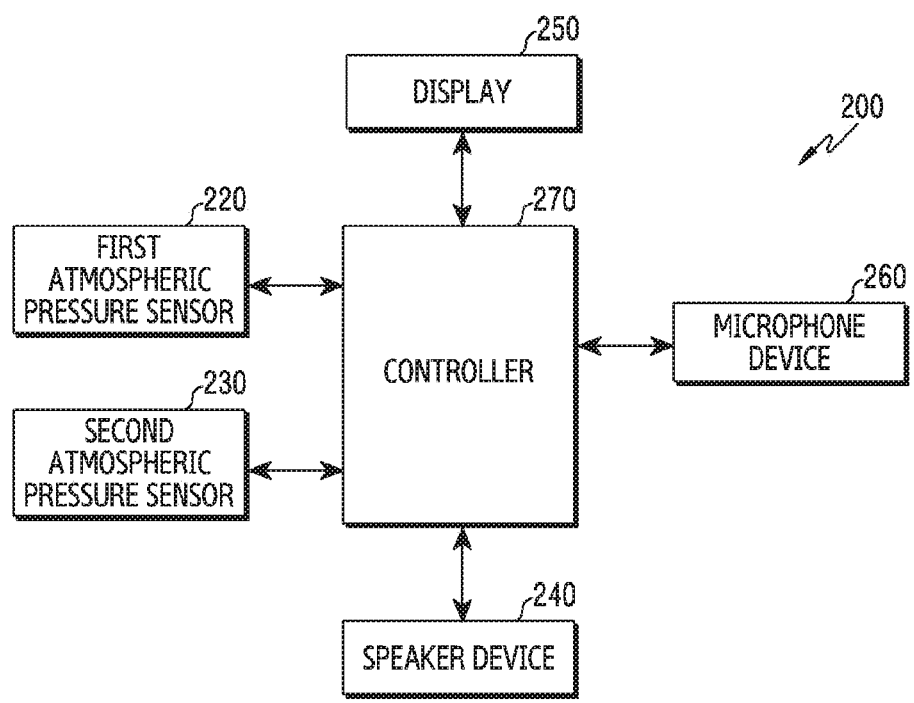
FIG. 2 is a block diagram of an electronic device including an atmospheric pressure sensor according to various embodiments of the disclosure.

FIG. 2 is a block diagram of an electronic device including an atmospheric pressure sensor according to various embodiments of the disclosure.

The electronic device 200 of FIG. 2 may be similar to the electronic device 101 of FIG. 1 at least in part, or may include other embodiments of the electronic device.

Referring to FIG. 2, the electronic device 200 (for example, the electronic device 101 of FIG. 1) may include a controller 270 (for example, the processor 120 of FIG. 1), a first atmospheric pressure sensor 220, a second atmospheric pressure sensor 230, a speaker device 240 (for example, the sound output device 155 of FIG. 1), a display 250 (for example, the display device 160 of FIG. 1), or a microphone device 260 (for example, the input device 150 of FIG. 1). According to an embodiment, the first atmospheric pressure sensor 220 may be disposed in a sound wave guide space which is connected with the speaker device 240 disposed inside the electronic device 200, and is exposed to the outside. According to an embodiment, since the first atmospheric pressure sensor 220 is exposed to the outside, the first atmospheric pressure sensor may include a waterproof function. According to an embodiment, the second atmospheric pressure sensor 203 may be disposed in an inner space of the electronic device 200 which is sealed from the outside. According to an embodiment, the second atmospheric pressure sensor 230 may be implemented in a non-waterproof form, and may measure an internal atmospheric pressure of the electronic device 200.

According to various embodiments, the speaker device 240 may output a sound through the sound wave guide space connected with the outside of the electronic device 200. According to an embodiment, the speaker device 240 may operate as a driver to repel water remaining in a speaker hole or the sound wave guide space after the electronic device 200 is immersed in water.

According to various embodiments, the controller 270 may determine whether the electronic device 200 is immersed in water, based on a sudden atmospheric pressure change of a predetermined value or higher that is provided through the first atmospheric pressure sensor 220. According to an embodiment, the controller 270 may determine a type of immersion of the electronic device 200, based on the atmospheric pressure change provided from the first atmospheric pressure sensor 220. According to an embodiment, the controller 270 may determine immersion of the electronic device 200, and may operate the speaker device 240 to generate a pressure (for example, a sound pressure) to push water remaining in the sound wave guide space to the outside of the electronic device 200. According to an embodiment, when the speaker device 240 operates for the purpose of repelling water, the speaker device 240 may operate in a non-audible frequency band. According to an embodiment, when the speaker device 240 operates for the purpose of repelling water, the speaker device 240 may operate in a frequency band in which a diaphragm of the speaker device 200 vibrates highest. According to various embodiments, the controller 270 may operate the speaker device 240 until an atmospheric pressure value measured through the second atmospheric pressure sensor 230 disposed inside the electronic device 200 and an atmospheric pressure value measured by the first atmospheric pressure sensor 220 are identical to each other, or the atmospheric pressure value of the first atmospheric pressure sensor falls within a predetermined range with reference to the measured atmospheric pressure value. This is not only to push water remaining inside the electronic device 200 to the outside, but also to prevent a damage of an electronic component disposed inside the electronic device 200 caused due to a difference in atmospheric pressure by making internal, external atmospheric pressures of the electronic device 200 identical.

According to various embodiments, when it is determined that the electronic device is immersed in water through the first atmospheric pressure sensor 220, the controller 270 may output related information through the display 250. However, this should not be considered as limiting. When it is determined that the electronic device is immersed in water through the first atmospheric pressure sensor 220, the controller 270 may control to output related information through a tactile outputting means (for example, a vibrator) or an acoustic outputting means (for example, a speaker device). According to an embodiment, when it is determined that water-repelling is completed through the first atmospheric pressure sensor 220 and the second atmospheric pressure sensor 230, the controller 270 may control to output related information through the display 250.

According to various embodiments, the controller 270 may control to output a sound for detecting through the speaker device 240 in order to detect remaining water. According to an embodiment, the sound for detecting may include a sound having a non-audible frequency band. According to an embodiment, the sound for detecting may include a super-high frequency band or a very low frequency band. According to an embodiment, the controller 270 may control to receive the sound for detecting, outputted through the speaker device 240, through the microphone device 260. According to an embodiment, the controller 270 may determine whether the sound received through the microphone device 260 falls within a reference range. According to an embodiment, when the sound received through the microphone device 260 does not fall within the reference range, the controller 270 may recognize immersion and may continue operating the speaker device 240 to repel water. According to an embodiment, the microphone device 260 may include a directional microphone device or an omnidirectional microphone device.

Figure 3A:
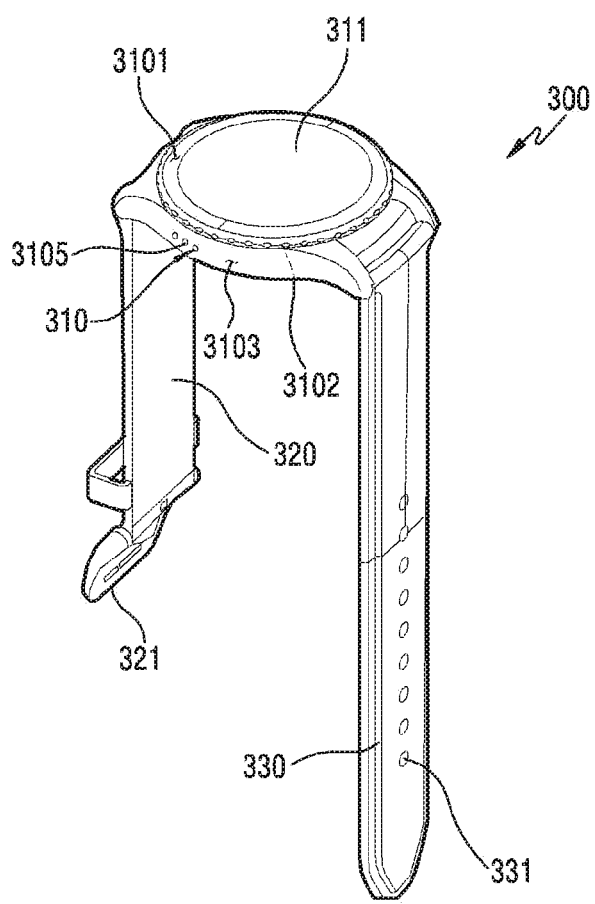
FIG. 3A is a perspective view of an electronic device according to various embodiments of the disclosure.

FIG. 3A is a perspective view of an electronic device according to various embodiments of the disclosure.

The electronic device 300 of FIG. 3A may be similar to the electronic device 101 of FIG. 1 or the electronic device 200 of FIG. 2 at least in part, or may include other embodiments of the electronic device.

Figure 3B:
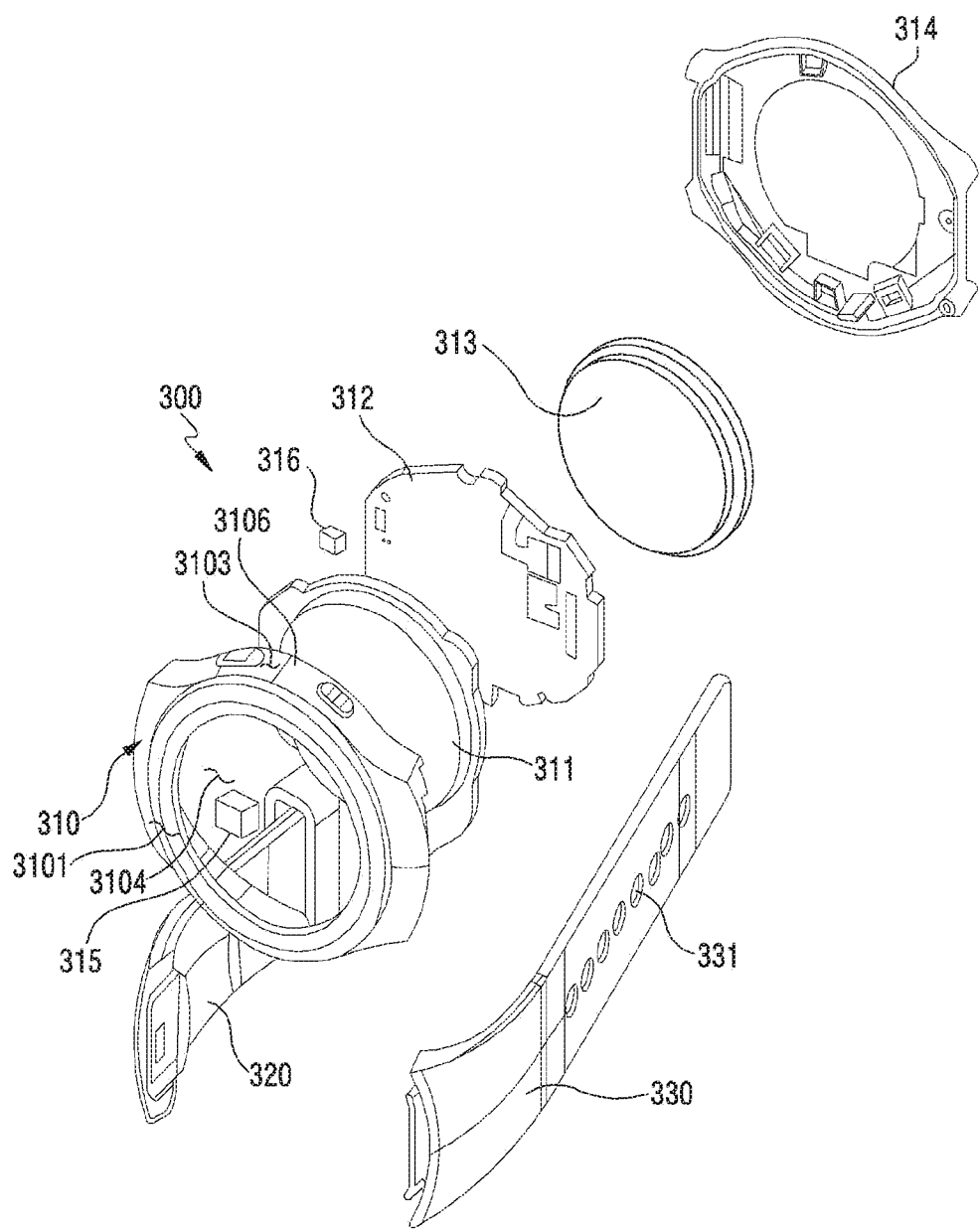
FIG. 3B is an exploded perspective view of the electronic device of FIG. 3A according to various embodiments of the disclosure.

Referring to FIGS. 3A and 3B, the electronic device 300 (for example, the electronic device 101 of FIG. 1) may include a wearable electronic device which is worn on a wrist of a user. According to an embodiment, the electronic device 300 may include a first surface 3101 facing in a first direction, a second surface 3102 facing in a second direction opposite to the first direction, and a side surface 3103 surrounding a space between the first surface 3101 and the second surface 3102. According to an embodiment, a housing 310 may include a display 311 (for example, the display device 160 of FIG. 1) disposed to be exposed to the outside through the first surface 3101. According to an embodiment, the display 311 may include a touch screen display. According to an embodiment, the display 311 may include a pressure sensitive touch screen display which reacts to a pressure.

According to various embodiments, the electronic device 300 may include one pair of coupling members 320, 330 (for example, a connection portion, a strap, etc.) pivotably disposed on one end and the other end of the housing 310, respectively, and baying predetermined lengths. According to an embodiment, a buckle member 321 may be disposed on an end of the first coupling member 320 disposed on one end of the housing 110, and the second coupling member 330 disposed on the other end may include a plurality of openings 331 formed at regular intervals to be coupled with the buckle member 321. According to an embodiment, the electronic device 300 may be worn by winding the first coupling member 320 and the second coupling member 330 around the wrist with the housing 310 being placed on the user's wrist, and using the buckle member 321 and the openings 331. However, this should not be considered as limiting. Various well-known fastening structures may be applied to fasten one pair of coupling members 320, 330.

According to various embodiments, the electronic device 300 may have a plurality of speaker holes 3105 formed on the side surface 3103. According to an embodiment, a microphone hole (for example, a microphone hole 3106 of FIG. 3B) may be disposed on a position on the side surface opposite to the speaker holes 3105.

FIG. 3B is an exploded perspective view of the electronic device of FIG. 3A according to various embodiments of the disclosure.

Referring to FIG. 3B, the electronic device 300 (for example, the electronic device 101 of FIG. 1) may include the housing 310 including an opening 3104, the display 311 (for example, the display device 160 of FIG. 1) disposed to have at least a portion exposed through the opening 3104, a substrate 312 (for example, a printed circuit board (PCB)) disposed on a rear surface of the display 311, a power receiving coil member 313 disposed to be electrically connected to the substrate 312, and a rear surface cover 314 coupled with the housing 310. According to an embodiment, the electronic device 300 may include a speaker device 315 (for example, the sound of output device 155 of FIG. 1) disposed inside the electronic device 300 to correspond to the speaker hole (for example, the speaker hole 3105 of FIG. 3A) formed on the side surface 3103 of the housing 310, and a microphone device 316 (for example, the input device 150 of FIG. 1) disposed inside the electronic device 300 to correspond to the microphone hole 3106 formed on the side surface 3103 of the housing 310.

According to various embodiments, when the electronic device 300 is immersed in water, water may flow into the electronic device through the speaker hole 3105. According to an embodiment, the electronic device 300 may recognize immersion through a first atmospheric pressure sensor (for example, the first atmospheric pressure sensor 220 of FIG. 2) disposed in a sound wave guide space between the speaker hole 3105 and the speaker device 315 disposed therein. According to an embodiment, the electronic device 300 may operate the speaker device 315 according to recognition of the immersion, and may provide a pressure of a predetermined level to the sound wave guide space, and water remaining in the sound wave guide space may be discharged to the outside of the electronic device 300 through the speaker hole 3105 by the corresponding pressure.

Hereinafter, an arrangement relationship of a first atmospheric pressure sensor, a second atmospheric pressure sensor, and a speaker device will be described in detail.

Figure 4:
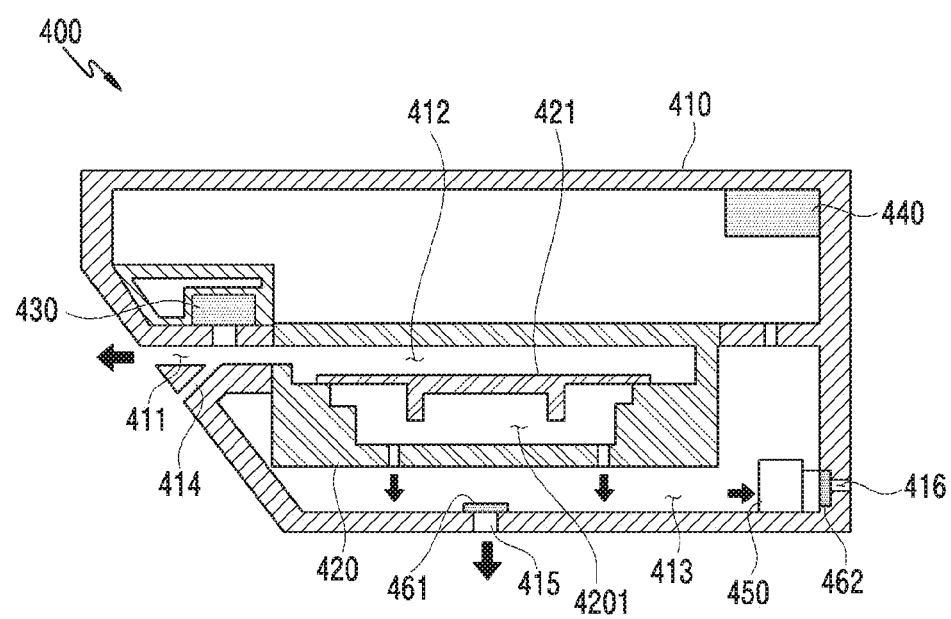
FIG. 4 is a cross-sectional view of a main part of an electronic device according to various embodiments of the disclosure.

FIG. 4 is a cross-sectional view of a main part of an electronic device according to various embodiments of the disclosure.

The electronic device 400 of FIG. 4 may be similar to the electronic device 101 of FIG. 1, the electronic device 200 of FIG. 2, or the electronic device 300 of FIG. 3A at least in part, or may include other embodiments of the electronic device. According to an embodiment, the electronic device 200 of FIG. 2, the electronic device 300 of FIG. 3A, and the electronic device 400 of FIG. 4 may be the electronic device 101 of FIG. 1.

Referring to FIG. 4, the electronic device 400 (for example, the electronic device 101 of FIG. 1) may include a speaker device 421 (for example, the sound output device 155 of FIG. 1) disposed therein. According to an embodiment, the speaker device 421 may be disposed inside a speaker housing 420 having a predetermined space. According to an embodiment, the electronic device 400 may include a first space 411 (for example, a sound wave guide space) connected to a speaker hole (for example, the speaker hole 3105 of FIG. 3A) through a housing 410.

According to various embodiments, the speaker housing 420 may be divided, by the speaker device 421, into a second space 412 connected with the first space 4111, and a space 4201 connected with a third space 413 provided as an inner space of the electronic device 400. According to an embodiment, the electronic device 400 may include a separation member (not shown) disposed between the first space 411 and the second space 412 to spatially separate the first space 411 and the second space 412. According to an embodiment, the separation member may be formed with a mesh to prevent water, dust, etc. from entering the first space 411 of the electronic device to some degree. According to an embodiment, the space 4201 separated by the speaker device 421 of the speaker housing 420 may be connected with the inside of the electronic device 400 to allow a smooth operation of the speaker device 421. According to an embodiment, the electronic device 400 may include an opening 415 formed on the housing 410. According to an embodiment, the opening 415 may prevent water from entering from the outside by using a waterproof film 461 disposed on the housing 461 to open and close the opening 415, and may receive inflow of the air from the outside.

According to various embodiments, the electronic device 400 may include a first atmospheric pressure sensor 430 disposed to be exposed to the first space 411 connected with the outside. According to an embodiment, the first atmospheric pressure sensor 430 may be disposed in the housing 430 to be exposed to the first space 411. According to an embodiment, the electronic device 400 may include a second atmospheric pressure sensor 440 disposed in the third space 413 which is a sealed inner space. According to an embodiment, the first atmospheric pressure sensor 430 may be configured to have a waterproof function. According to an embodiment, since the first atmospheric pressure sensor 430 is disposed in the first space 411 of the electronic device 400 exposed to the outside, the first atmospheric pressure sensor may detect atmospheric pressure information immediately reflecting a change in the state of the electronic device 400. According to an embodiment, the second atmospheric pressure sensor 440 may be disposed in the third space 413 sealed from the outside of the electronic device, and may detect an internal atmospheric pressure of the electronic device 400. According to an embodiment, the electronic device 400 may include a microphone device 450 (for example, the input device 150 of FIG. 1) disposed in the third space 413. According to an embodiment, the microphone device 450 may collect an external sound through an opening 416 formed on the housing 410 and scaled from the outside through a waterproof film 462. According to an embodiment, the microphone device 450 may be used to collect a sound for detecting outputted from the speaker device 421 in order to detect water remaining in the electronic device 400 after the electronic device 400 is immersed in water.

According to various embodiments, when the electronic device 400 is immersed in water, water may flow into the first space 411 and/or the second space 412. According to an embodiment, the electronic device 400 may recognize immersion through the first atmospheric pressure sensor 430, and then may operate the speaker device 421 to repel water. According to an embodiment, a pressure may be generated in a direction from the second space 412 to the first space 411 due to a vibration of a diaphragm of the speaker device 421, and remaining water may be discharged to the outside through the pressure.

According to various embodiments the electronic device 400 may further have at least one air inlet 414 which may be connected with the first space 411 through change of the structure of the housing 410. The air inlet 414 may be used as a passage to allow air to enter from the outside in order to prevent water discharged by the pressure generated during the vibration of the speaker device 421 from entering back into the second space due to the single space (for example, the first space 411).

Figure 5:
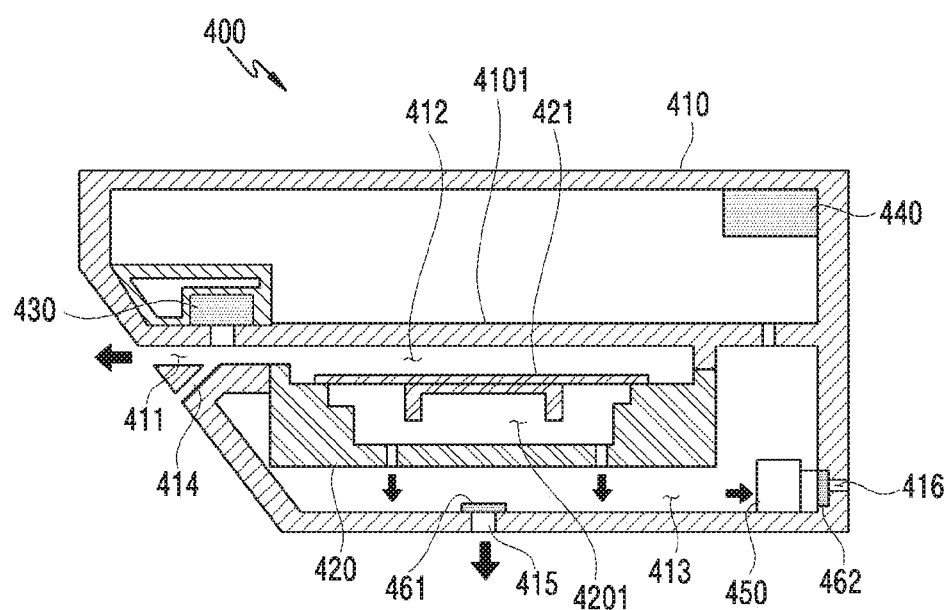
FIG. 5 is a cross-sectional view of a main part of an electronic device according to various embodiments of the disclosure.

FIG. 5 is a cross-sectional view of a main part of an electronic device according to various embodiments of the disclosure.

A configuration of FIG. 5 is substantially similar to the configuration of FIG. 4, and the second space 412 separated from an inner space (for example, the third space 413) may be guaranteed by using at least a portion of the housing 410 of the electronic device, rather than a single speaker housing.

According to various embodiments, the electronic device 400 (for example, the electronic device 101 of FIG. 1) may have the first space 411 guaranteed by using the structure of the housing 410, and may provide the second space 412 by using the speaker housing 420 accommodating the speaker device 421 and a partition 4101 integrally formed with the electronic device housing 410. According to an embodiment, the second space 412 may be connected with the first space 411, and may be formed as a space separated from the inner space (for example, the third space 413) of the electronic device 400 by a coupling structure of the speaker device 421, the speaker housing 420, and the partition 4101 of the electronic device housing 410.

Figure 6A:
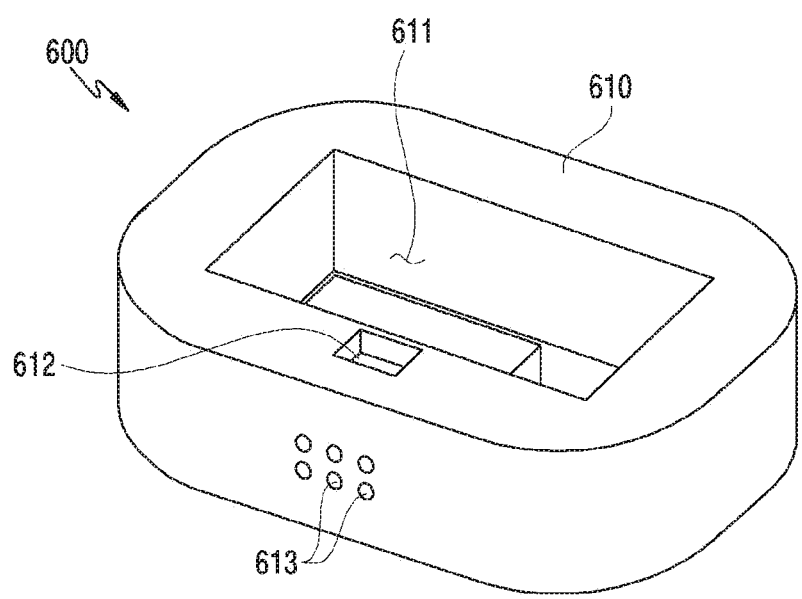
FIGS. 6A and 6B are views schematically illustrating a housing applied to an electronic device according to various embodiments of the disclosure.
Figure 6B:
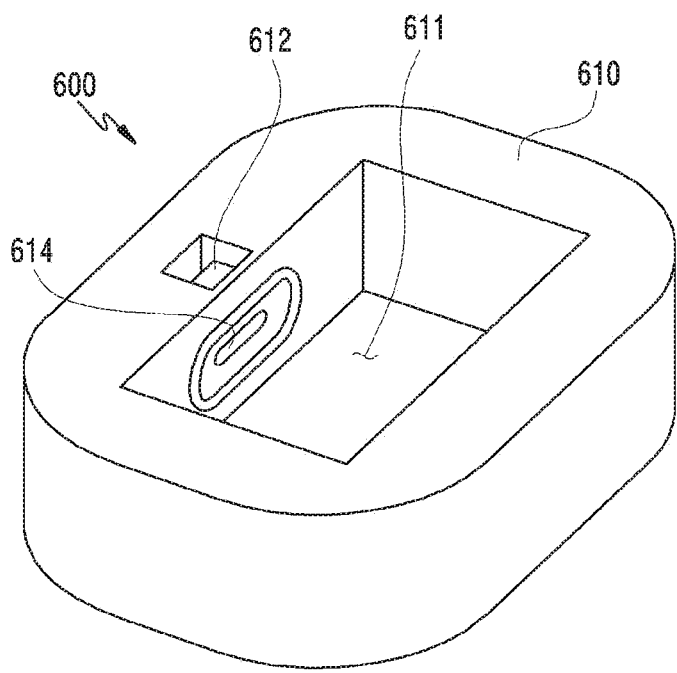

FIGS. 6A and 6B are views schematically illustrating a housing applied to an electronic device according to various embodiments of the disclosure.

The electronic device 600 of FIGS. 6A and 6B may be the electronic device 101 of FIG. 1.

A housing 610 of FIG. 6A may be similar to the housing 410 of FIGS. 4 and 5 at least in part, or may include other embodiments of the housing.

Referring to FIGS. 6A and 6B, the electronic device 600 (for example, the electronic device 101 of FIG. 1) may include the housing 610. According to an embodiment, the housing 610 may include a speaker mounting portion 611. According to an embodiment, the housing 610 may include a sound wave guide space (for example, the first space 411 of FIG. 4) connected from an inner space of the speaker mounting portion 611 to a speaker hole 613 formed on an outside of the housing. According to an embodiment, the housing 610 may include an atmospheric pressure sensor mounting portion 612 to have a first atmospheric pressure sensor (for example, the first atmospheric pressure sensor 430 of FIG. 4) disposed to be exposed in the sound wave guide space. Accordingly, the atmospheric pressure sensor mounting portion 612 and the sound wave guide space 614 may be formed to be connected with each other.

According to various embodiments, a plurality of speaker holes 613 formed on the housing 610 may include at least one hole connected with the sound wave guide space 614, and at least one hole connected with an air inlet (for example, the air inlet 414 of FIG. 4). According to an embodiment, the hole connected with the air inlet may also be applied to the speaker hole, such that an aesthetic exterior of the electronic device can be achieved.

Figure 7A:
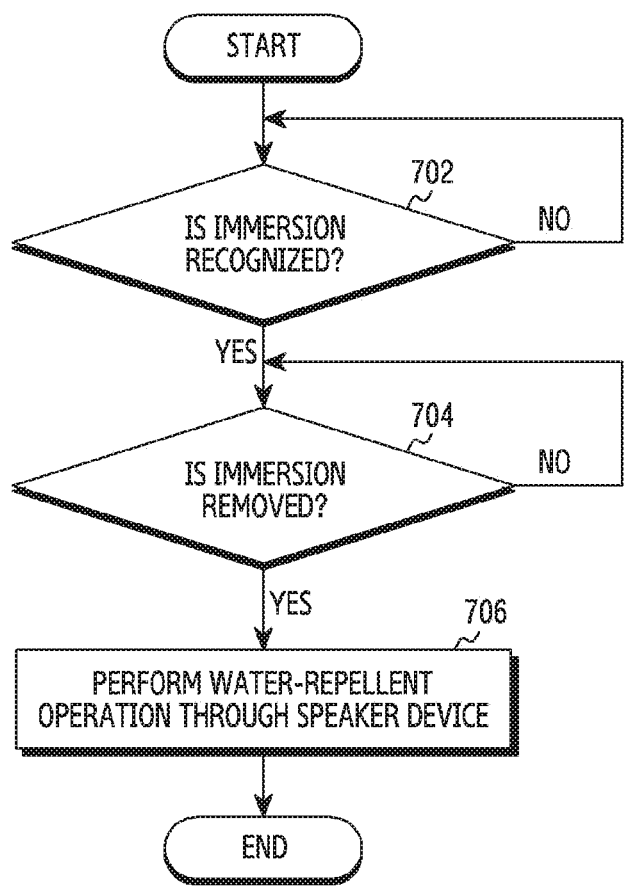
FIGS. 7A and 7B are flowcharts illustrating a water-repellent operation of after an electronic device is immersed in water according to various embodiments of the disclosure.

FIG. 7A is a flowchart illustrating a water-repellent operation after an electronic device is immersed in water according to various embodiments of the disclosure.

Referring to FIG. 7A, in operation 702, the electronic device (for example, the electronic device 101 of FIG. 1 or the electronic device 400 of FIG. 4A) may determine whether the electronic device is immersed in water. According to an embodiment, the electronic device may recognize immersion through a first atmospheric pressure sensor (for example, the first atmospheric pressure sensor 430 of FIG. 4A) installed in a first space (for example, the first space 411 of FIG. 4A) to be exposed to the outside of the electronic device. According to an embodiment, the electronic device may determine whether the electronic device is immersed in water through a change in the atmospheric pressure detected by the first atmospheric pressure sensor.

In operation 704, the electronic device (for example, the electronic device 101 of FIG. 1 or the electronic device 400 of FIG. 4) may determine whether the immersion is removed through the first atmospheric pressure sensor (for example, the first atmospheric pressure sensor 430 of FIG. 4A). According to an embodiment, when the first atmospheric pressure sensor exposed to the outside and immediately reacting to a surrounding environment is restored to an original atmospheric pressure state, the electronic device may determine that immersion is removed. According to an embodiment, when the first atmospheric pressure sensor is restored to atmospheric pressure, the electronic device may determine that immersion is removed.

In operation 706, after immersion is removed, the electronic device (for example, the electronic device 101 of FIG. 1 or the electronic device 400 of FIG. 4) may perform a water-repellent operation by operating for example, driving) a speaker device (for example, the sound output device 155 of FIG. 1 or the speaker device 421 of FIG. 4A). According to an embodiment, when the speaker device operates for the purpose of repelling water, the speaker device may operate in a non-audible frequency band. According to an embodiment when the speaker device operates for the purpose of repelling water, the speaker device may operate in a frequency band in which a diaphragm of the speaker device 200 vibrates highest. According to various embodiments, in operation 706, the electronic device (for example, the electronic device 101 of FIG. 1 or the electronic device 400 of FIG. 4) may perform the water-repellent operation by operating the speaker device 421 for a designated time. For example, a water-repelling time of the speaker device 421 may be set by a user. According to various embodiments, the electronic device 101 or 400 may receive a signal which is outputted when the speaker 421 performs the water-repellent operation through the microphone 450, and the controller may analyze the received signal and determine whether to finish the water-repellent operation.

Figure 7B:
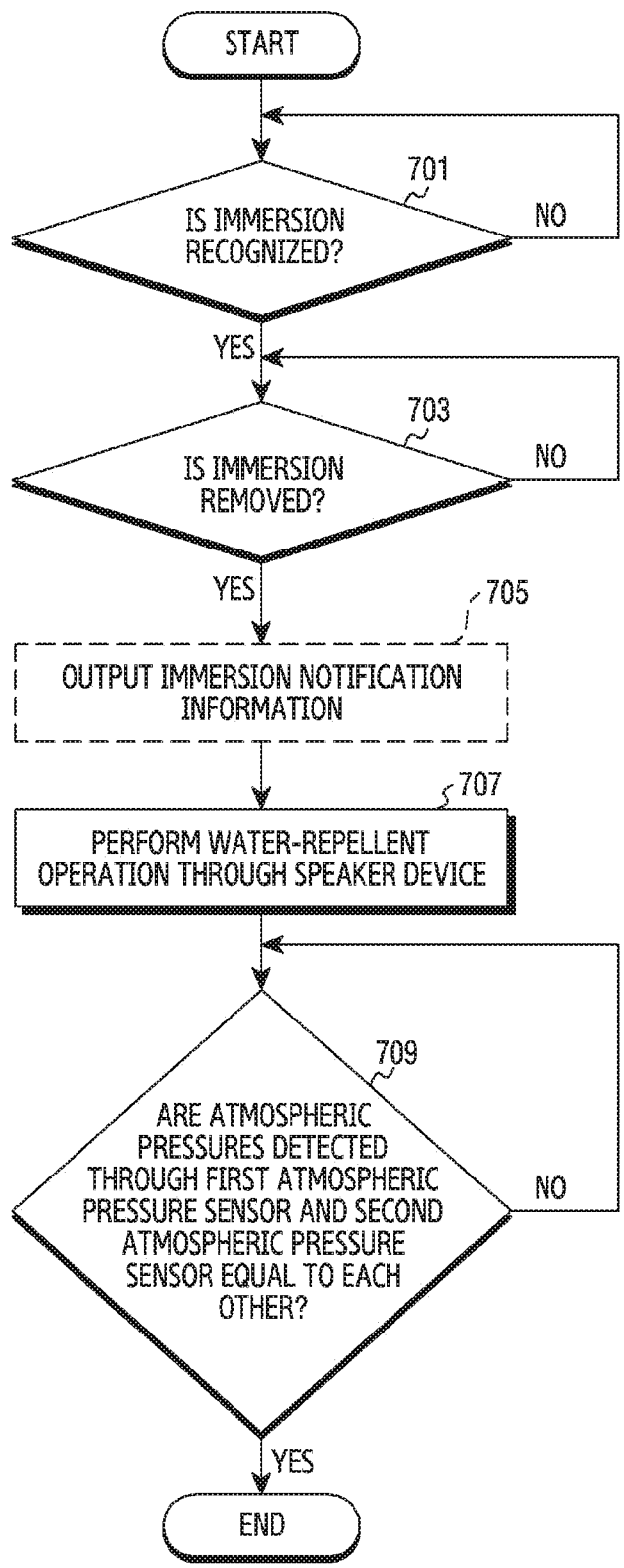
Figure 8A:
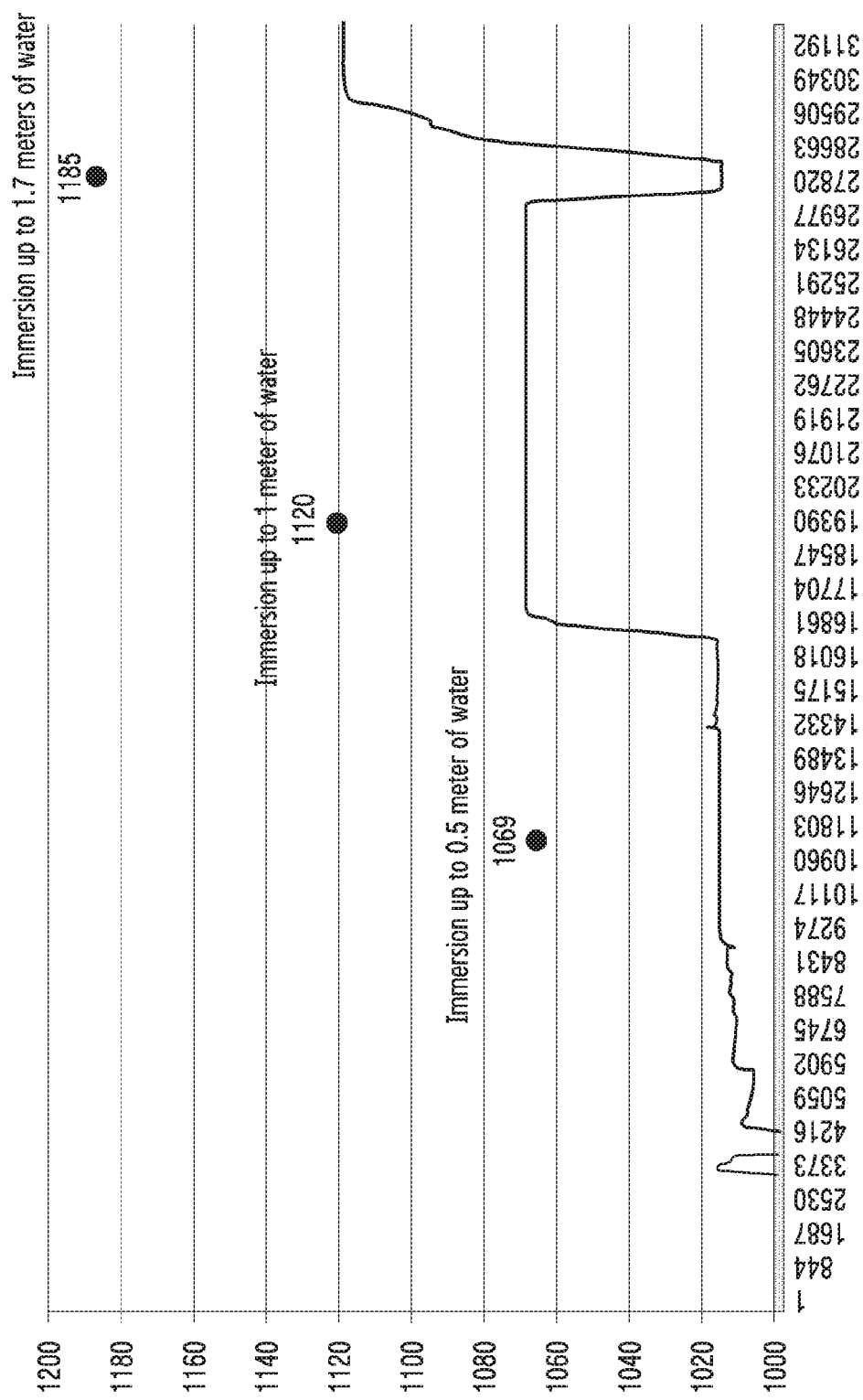
FIGS. 8A to 8D are graphs illustrating an atmospheric pressure change according to an immersion state of an electronic device according to various embodiments.
Figure 8B:
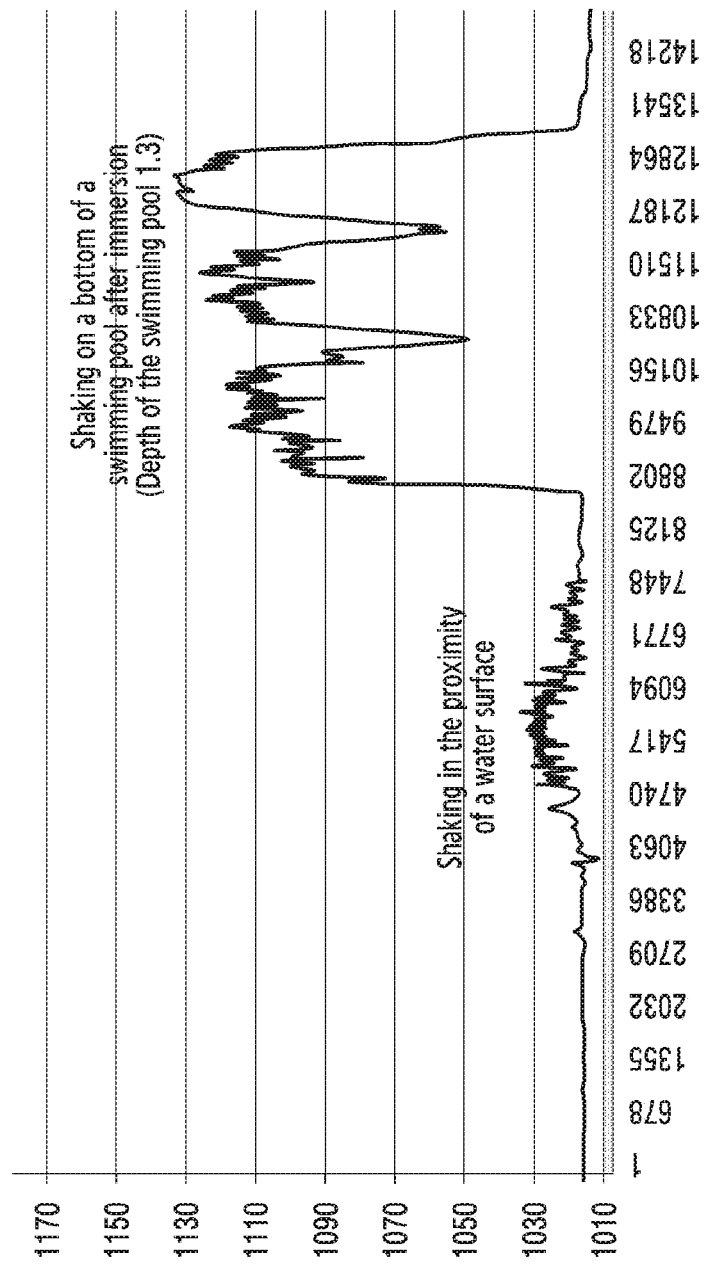
Figure 8C:
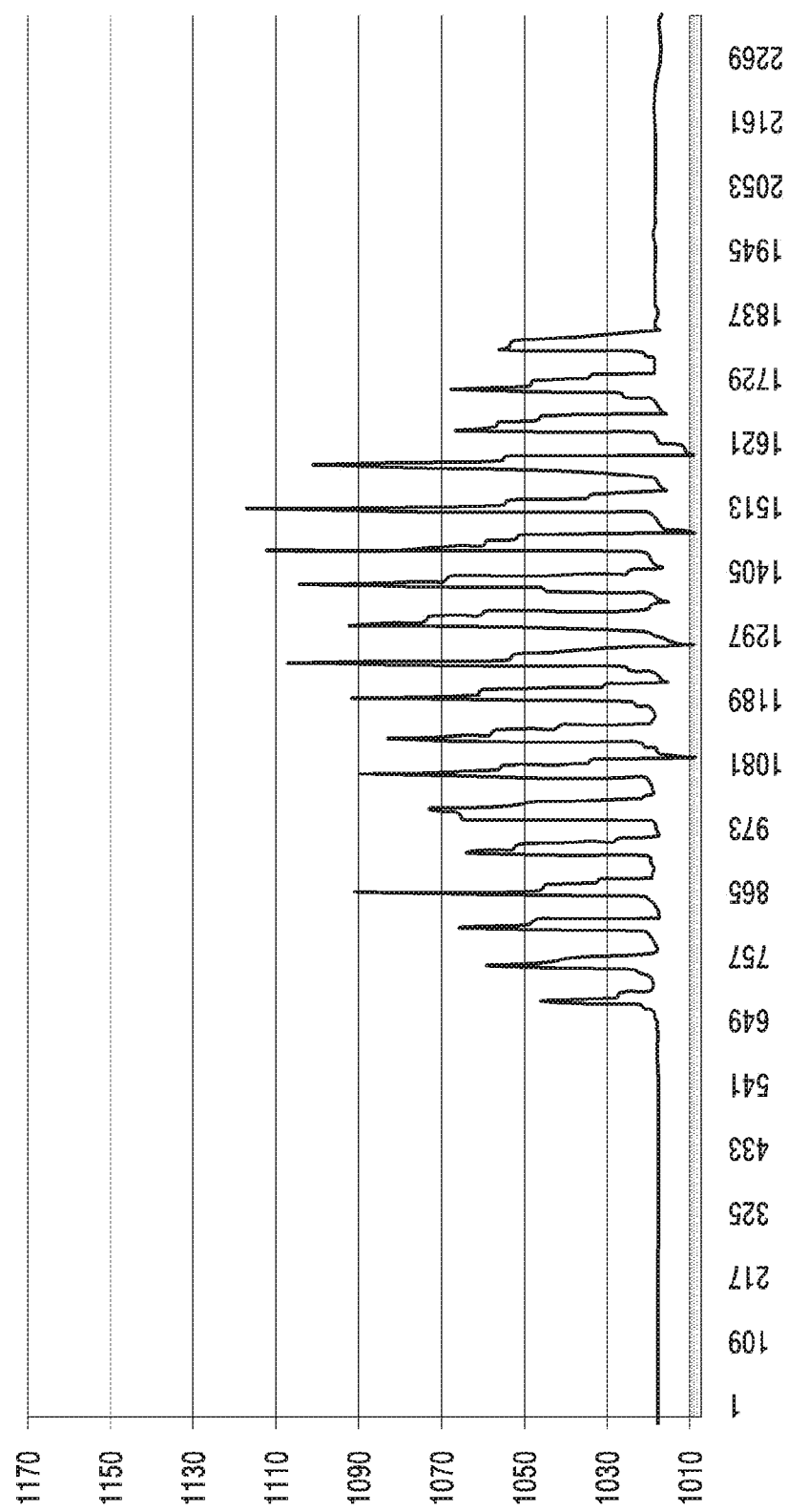
Figure 8D:
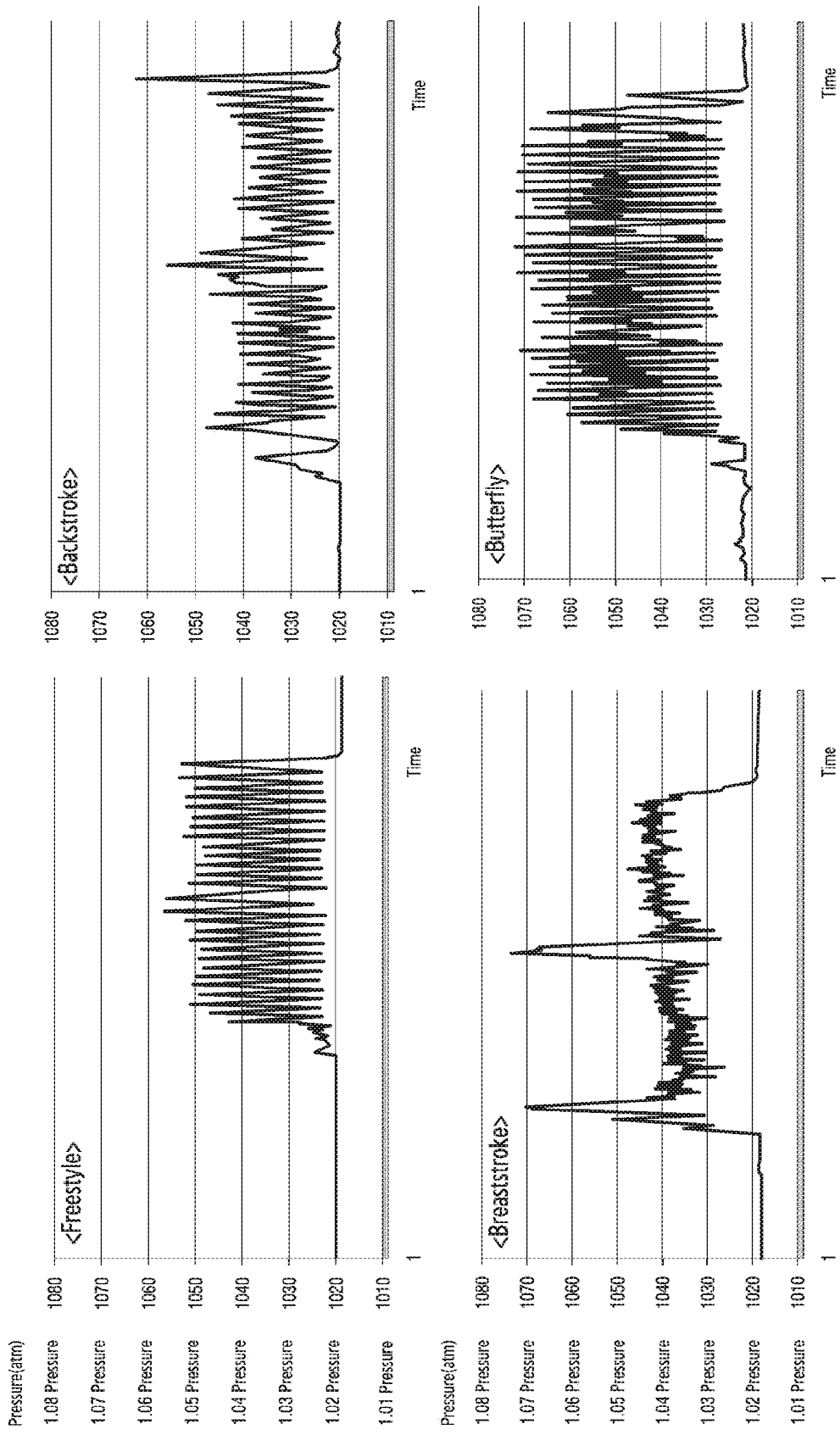
Figure 9A:
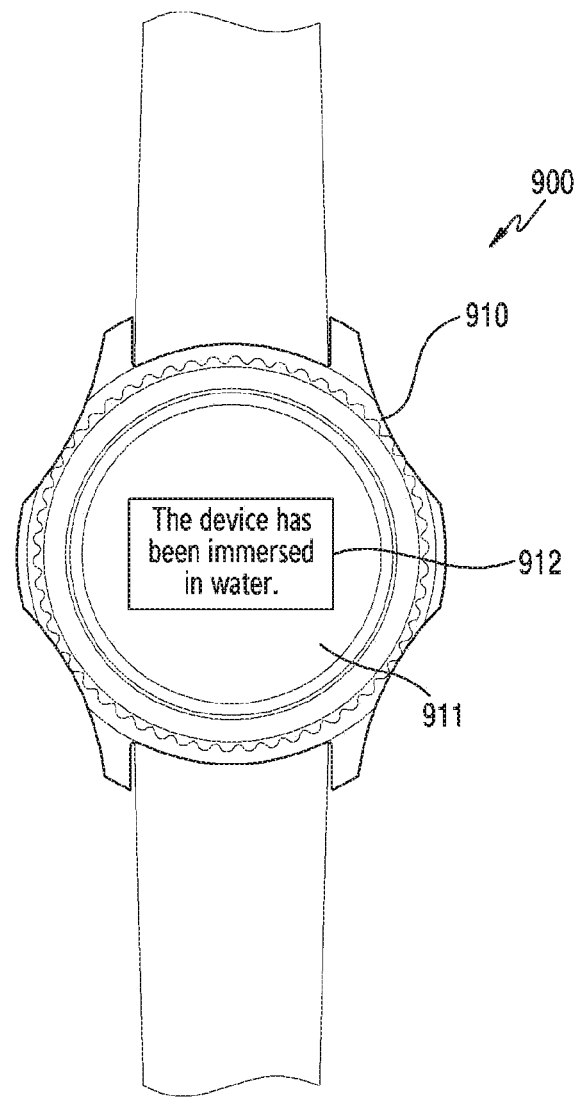
FIGS. 9A and 9B are views illustrating an electronic device displaying a notification message according to immersion and water repelling of an electronic device according to an embodiment of the disclosure.
Figure 9B:
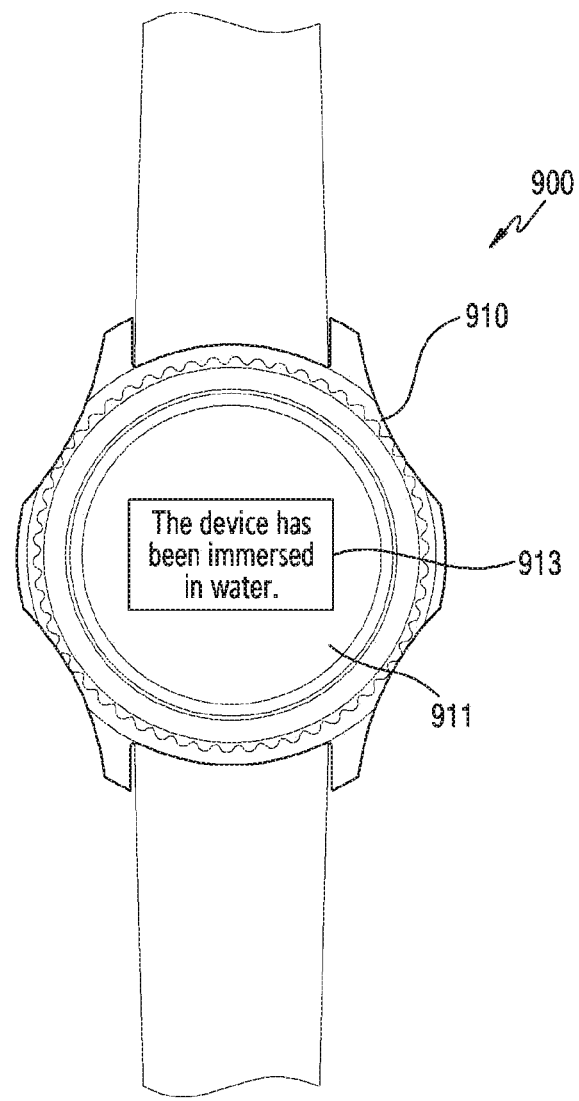
Figure 10:
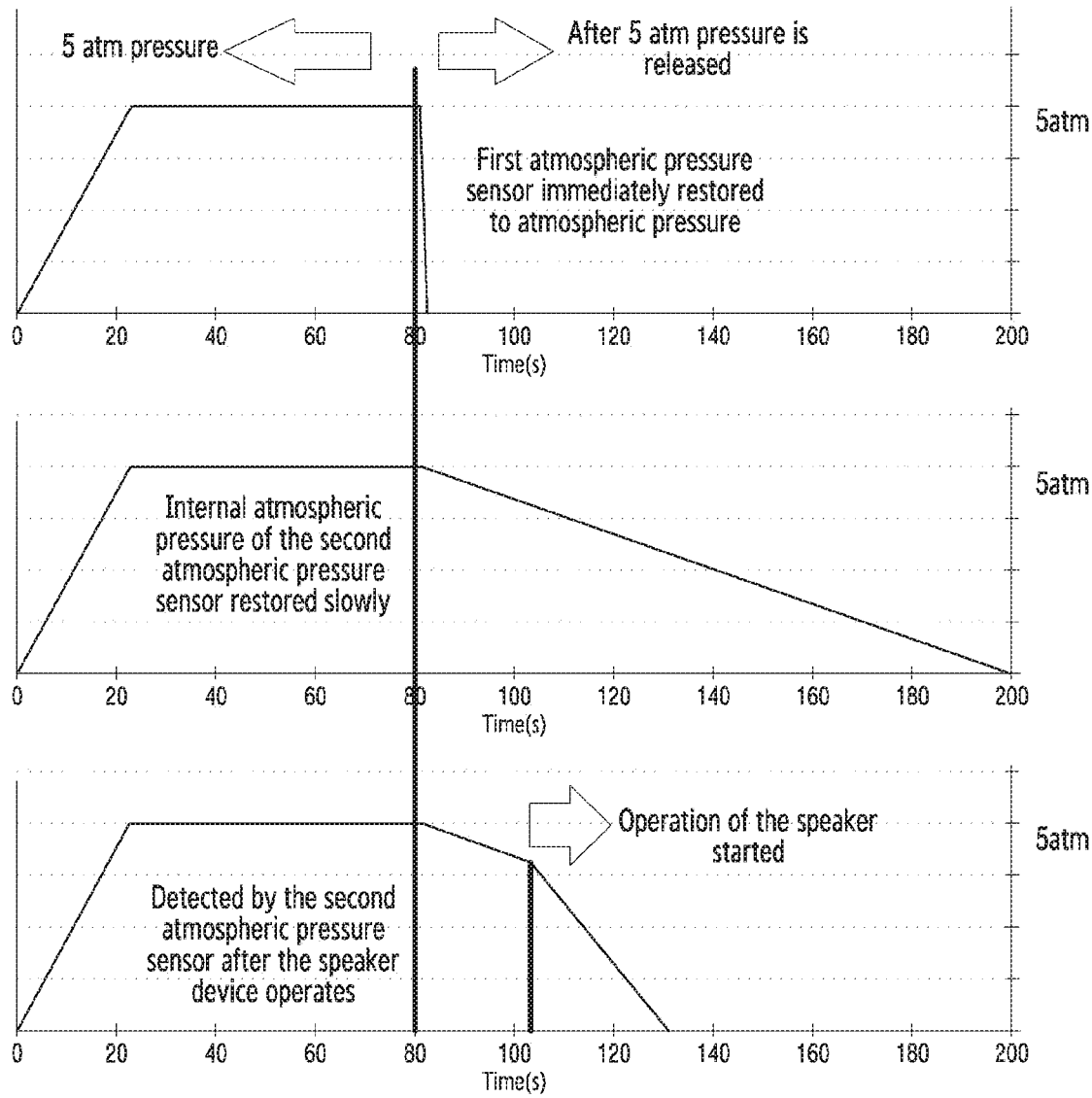
FIG. 10 is a graph related to a restoring time of a second atmospheric pressure sensor according to an operation of a speaker device according to various embodiments of the disclosure.

FIG. 7B is a flowchart illustrating a water-repellent operation after an electronic device is immersed in water according to various embodiments of the disclosure. FIGS. 8A to 8D are graphs illustrating change in atmospheric pressure according to an immersion state of the electronic device according to various embodiments of the disclosure. FIGS. 9A and 9B are views of an electronic device displaying a notification message according to immersion and water-repelling of the electronic device according to various embodiments of the disclosure. FIG. 10 is a graph related to a restoring time of a second atmospheric pressure sensor according to an operation of a speaker device according to various embodiments of the disclosure.

Referring to FIG. 7B, the electronic device (for example, the electronic device 101 of FIG. 1 or the electronic device 400 of FIG. 4A) may determine whether the electronic device is immersed in water in operation 701. According to an embodiment, the electronic device may recognize immersion through a first atmospheric pressure sensor (for example, the first atmospheric pressure sensor 430 of FIG. 4A) installed in a first space (for example, the first space 411 of FIG. 4A) to be exposed to the outside of the electronic device. According to an embodiment, the electronic device may determine whether the electronic device is immersed in water through a change in the atmospheric pressure detected from the first atmospheric pressure sensor. According to an embodiment, the electronic device may detect immersion of the electronic device based on table 1 presented below:

TABLE 1

| | | Atmospheric Pressure Change Value (hpa) | |
|---|---|---|---|
| | | Atmospheric Pressure Change Value Range | Unit Time of Change of Atmospheric Pressure |
| Swimming | Butterfly | 25-50 | within 1 second |
| | Freestyle | 25-45 | within 1 second |
| | Breaststroke | 15-55 | within 1 second |
| | Backstroke | 19-40 | within 1 second |
| Paddling | | 10-80 | within 1 second |
| Sink, shower hose | | 2-55 | within 1 second |
| Moving between stories | | 0.4 (0.04 per second) | about 10 seconds |
| Express elevator(101th floor) | | 40 (1.14 per second) | about 35 seconds |

According to various embodiments, the electronic device may recognize immersion when an atmospheric pressure is changed by a predetermined value or higher per second. For example, when the atmospheric pressure is changed within a range from 2 hpa to 80 hpa per second, the electronic device may recognize this change as immersion. According to an embodiment, when the electronic device moves between stories or moves by riding the elevator, the electronic device may detect a change in atmospheric pressure, but in this case, a change in atmospheric pressure per second may be implemented as 0.04 hpa and 1.14 hpa, and thus may not be recognized as immersion.

According to various embodiments, when the electronic device is immersed in water, the electronic device may detect a type of immersion. For example, by referring to a change in atmospheric pressure changing according to a position of the electronic device under water as shown in FIG. 8A, by referring to a change in atmospheric pressure when the electronic device moves in the proximity of a water surface or moves at a predetermined depth under water after being immersed as shown in FIG. 8B, or by detecting a change in atmospheric pressure changing by hitting a water surface with the electronic device as shown in FIG. 8C or changing according to various types of swimming strokes as shown in FIG. 8D, the electronic device may detect a type of immersion.

In operation 703, the electronic device (for example, the electronic device 101 of FIG. 1 or the electronic device 400 of FIG. 4) may determine whether immersion is removed through the first atmospheric pressure sensor (for example, the first atmospheric pressure sensor 430 of FIG. 4A). According to an embodiment, when the first atmospheric pressure sensor exposed to the outside and immediately reacting to a surrounding environment is restored to an original atmospheric pressure state, the electronic device may determine that immersion is removed. According to an embodiment, the electronic device may determine that immersion is removed when the first atmospheric pressure sensor is restored to atmospheric pressure.

In operation 705, the electronic device (for example, the electronic device 101 of FIG. 1 or the electronic device 400 of FIG. 4) may output immersion notification information on immersion to the user. For example, as shown in FIG. 9A, an electronic device 900 may notify a user by displaying immersion notification information 912 through a display 911 disposed in a housing 910 to be exposed. According to an embodiment, after immersion is removed, the electronic device 900 may output immersion notification information through the display 911, or may output corresponding information through the display 911 while being under water. According to an embodiment, the immersion notification information may be acoustically outputted through a speaker, or may be tactually outputted through a vibrator (for example, a vibration motor).

In operation 707, after the immersion is removed, the electronic device (for example, the electronic device 101 of FIG. 1 or the electronic device 400 of FIG. 4) may perform a water-repellent operation by operating a speaker device (for example, the sound output device 155 of FIG. 1 or the speaker device 421 of FIG. 4A). According to an embodiment, when the speaker device operates for the purpose of repelling water, the speaker device may operate in a non-audible frequency band. According to an embodiment, when the speaker device operates for the purpose of repelling water, the speaker device may operate in a frequency band in which a diaphragm of the speaker device 200 vibrates highest.

According to various embodiments, in operation 707, the electronic device (for example, the electronic device 101 of FIG. 1 or the electronic device 400 of FIG. 4) may perform the water-repellent operation by operating the speaker device 421 for a designated time. For example, a water-repelling time of the speaker device 421 may be set by a user. According to various embodiments, the electronic device 101 or 400 may receive a signal outputted during the water-repellent operation of the speaker device 421 through the microphone 450, and the controller may determine whether to finish the water-repellent operation by analyzing the received signal.

In operation 709, the electronic device (for example, the electronic device 101 of FIG. 1 or the electronic device 400 of FIG. 4A) may determine whether first atmospheric pressure information measured by the first atmospheric pressure sensor (for example, the first atmospheric pressure sensor 430 of FIG. 4A), and second atmospheric pressure information measured through a second atmospheric pressure sensor (for example, the second atmospheric pressure sensor 440 of FIG. 4A) disposed in an inner space (for example, the third space 413 of FIG. 4) sealed from the outside are identical to each other. For example, since the second atmospheric pressure sensor may be restored relatively more slowly than the first atmospheric pressure sensor when the first atmospheric pressure sensor is restored to atmospheric pressure after being immersed as shown in FIG. 10, electronic components inside the electronic device may be damaged due to a difference in internal and external atmospheric pressures of the electronic device. Accordingly, the electronic device may operate the speaker device 240 for repelling water until the first atmospheric pressure information measured through the first atmospheric pressure sensor and the second atmospheric pressure information measured through the second atmospheric pressure sensor are identical to each other. This may be not only to repel water remaining in the electronic device to the outside, but also to prevent a damage to the electronic components disposed in the electronic device, which is caused by a difference in atmospheric pressure, by making internal and external atmospheric pressures of the electronic device identical to each other. In this case, as shown in FIG. 10, the time required to restore the second atmospheric pressure sensor may be noticeably shorter after the speaker device (for example, the speaker device 421 of FIG. 4A) operates than when the speaker device is not operated (for example, is not driven).

According to various embodiments, as shown in FIG. 9B, the electronic device may output water-repelling completion information 913 through the display 911 after the above-described condition is satisfied and the water-repellent operation is completed through the speaker. However, this should not be considered as limiting. The water-repelling completion information may be acoustically or tactually outputted through the electronic device as described above.

Figure 11:
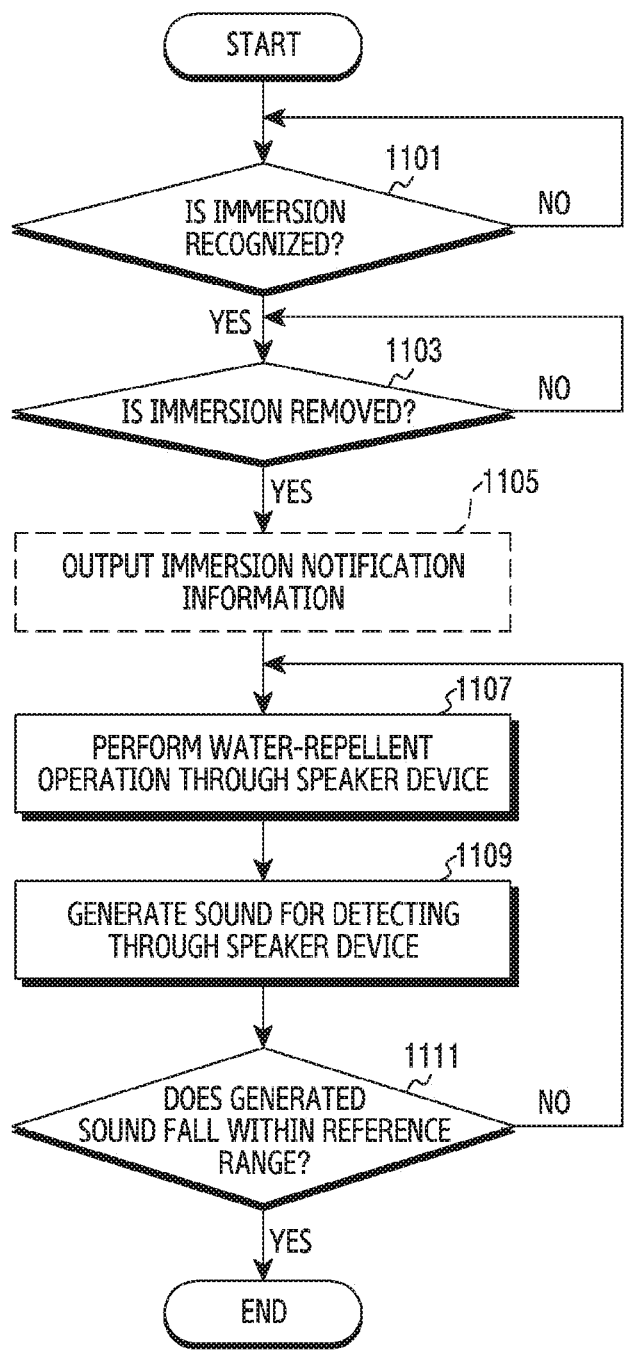
FIG. 11 is a flowchart illustrating an water-repellent operation after an electronic device is immersed in water according to various embodiments of the disclosure.

FIG. 11 is a flowchart illustrating a water-repellent operation after an electronic device is immersed in water according to various embodiments of the disclosure.

Referring to FIG. 11, the electronic device (for example, the electronic device 101 of FIG. 1 or the electronic device 400 of FIG. 4A) may determine whether the electronic device is immersed in water in operation 1101. According to an embodiment, the electronic device may recognize immersion through a first atmospheric pressure sensor (for example, the first atmospheric pressure sensor 430 of FIG. 4A) installed in a first space (for example, the first space 411 of FIG. 4A) to be exposed to the outside of the electronic device. According to an embodiment, the electronic device may determine whether the electronic device is immersed in water through a change in atmospheric pressure detected from the first atmospheric pressure sensor.

In operation 1103, the electronic device (for example, the electronic device 101 of FIG. 1 or the electronic device 400 of FIG. 4) may determine whether immersion is removed through the first atmospheric pressure sensor (for example, the first atmospheric pressure sensor 430 of FIG. 4A). According to an embodiment, when the first atmospheric pressure sensor exposed to the outside of the electronic device and immediately reacting to a surrounding environment is restored to an original atmospheric pressure state, the electronic device may determine that immersion is removed. According to an embodiment, when the first atmospheric pressure sensor is restored to atmospheric pressure, the electronic device may determine that immersion is removed.

In operation 1105, the electronic device (for example, the electronic device 101 of FIG. 1 or the electronic device 400 of FIG. 4) may output immersion notification information on immersion to a user. For example, as shown in FIG. 9A, the electronic device 900 may notify the user by displaying the immersion notification information 912 through the display 911 disposed in the housing 910 to be exposed. According to an embodiment, the electronic device 900 may output the immersion notification information through the display 911 after immersion is removed, or may output corresponding information through the display 911 while being immersed in water. According to an embodiment, the immersion notification information may be acoustically outputted through a speaker, or may be tactually outputted through a vibrator (for example, a vibration motor).

In operation 1107, after immersion is removed, the electronic device (for example, the electronic device 101 of FIG. 1 or the electronic device 400 of FIG. 4) may perform a water-repellent operation by operating a speaker device (for example, the sound output device 155 of FIG. 1 or the speaker device 421 of FIG. 4A). According to an embodiment, when the speaker device operates for the purpose of repelling water, the speaker device may operate in a non-audible frequency band. According to an embodiment, when the speaker device operates for the purpose of repelling water, the speaker device may operate in a frequency band in which a diaphragm of the speaker device 200 operates highest.

According to an embodiment, in operation 1107, the electronic device (for example, the electronic device 101 of FIG. 1 or the electronic device 400 of FIG. 4) may perform the water-repellent operation by operating the speaker device 421 for a designated time. For example, the water-repellent operation time of the speaker device 421 may be set by the user. According to various embodiments, the electronic device 101 or 400 may receive a signal outputted during the water-repellent operation of the speaker 421 through the microphone 450, and the controller may determine whether to finish the water-repellent operation by analyzing the received signal.

In operation 1109, the electronic device (for example, the electronic device 101 of FIG. 1 or the electronic device 400 of FIG. 4) may control to generate a sound for detecting through the speaker device (for example, the speaker device 421 of FIG. 4). According to an embodiment, the sound for detecting may include a sound having a non-audible frequency band. According to an embodiment, the sound for detecting may include a super-high frequency band or a very low frequency band. However, this should not be considered as limiting. The electronic device may perform a water-repellent operation through the speaker device when receiving a call, and may determine whether a sound for detecting detected through the microphone device falls within a normal range.

In operation 1111, the electronic device (for example, the electronic device 101 of FIG. 1 or the electronic device 400 of FIG. 4) may control to receive the sound for detecting, generated through the speaker device, through a microphone device (for example, the microphone device 450 of FIG. 4), and may determine whether the sound received through the microphone device falls within a reference range. This is because, when there is water remaining in a sound transmission path (for example, the first space 411 and/or the second space 412 of FIG. 4) of the speaker device, a different frequency from a frequency when there is no remaining water is generated. According to an embodiment, the microphone device (for example, the microphone device 450 of FIG. 4) may include a directional microphone or an omnidirectional microphone device.

According to various embodiments, when the frequency of the sound detected through the speaker device (for example, the electronic device 400 of FIG. 4) falls within the reference range, the electronic device (for example, the electronic device 101 of FIG. 1 or the electronic device 400 of FIG. 4) may determine whether the water-repellent operation is completed, and may stop the water-repellent operation of the speaker device. According to an embodiment, when the frequency of the detected sound does not fall within the reference range, the electronic device may determine that there remains water in the first space (for example, the first space 411 of FIG. 4) and/or the second space (the second space 412 of FIG. 4), and may proceed to operation 1107 to control to continuously perform the water-repellent operation of the speaker device (for example, the speaker device 421 of FIG. 4).

According to various embodiments of the disclosure, the electronic device (for example, the electronic device 101 of FIG. 1 or the electronic device 400 of FIG. 4) may operate the speaker device (for example, the speaker device 421 of FIG. 4) for the purpose of repelling water, and then may perform the water-repellent operation until an atmospheric pressure value of first atmospheric pressure information detected through the first atmospheric pressure sensor (for example, the first atmospheric pressure sensor 430 of FIG. 4), and an atmospheric pressure value of second atmospheric pressure information detected through the second atmospheric pressure sensor (for example, the second atmospheric pressure sensor of FIG. 4) are identical to each other, or may perform the water-repellent operation until the sound for detecting generated through the speaker device matches a normal frequency corresponding to removal of immersion.

However, the electronic device may perform the water-repellent operation in parallel with the above-described two processes.

The electronic device (for example, the electronic device 101 of FIG. 1 or the electronic device 400 of FIG. 4) may detect a current posture of the electronic device by using a gyro sensor (for example, the sensor module 176 of FIG. 1) (for example, a gyro sensor), and may output information related to posture correction of the electronic device to the user based on the detected posture, such that a smooth water-repellent operation can be induced, although this is not illustrated.

Figure 12A:
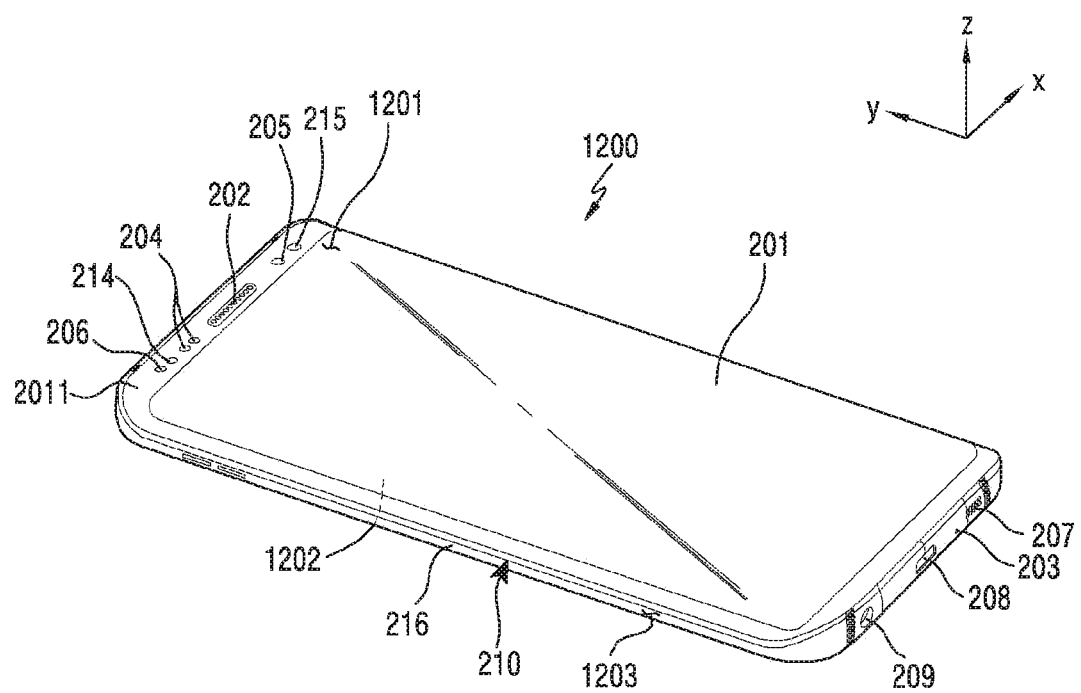
FIGS. 12A and 12B are perspective views of an electronic device according to various embodiments of the disclosure.
Figure 12B:
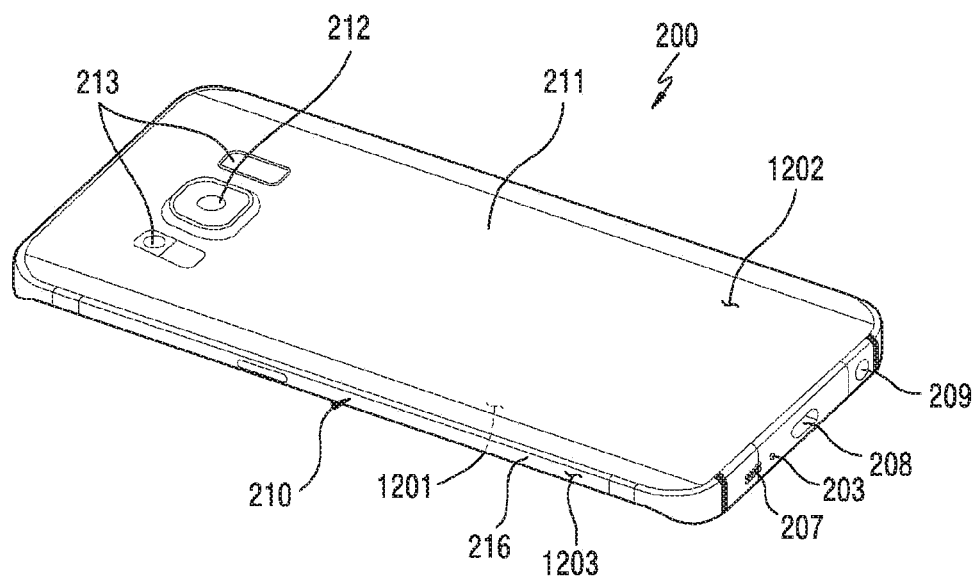

FIGS. 12A and 12B are perspective views of an electronic device according to various embodiments of the disclosure.

The electronic device 1200 of FIGS. 12A and 12B may be similar to the electronic device 101 of FIG. 1, the electronic device 200 of FIG. 2, or the electronic device 400 of FIG. 4 at least in part, or may include other embodiments of the electronic device.

Referring to FIGS. 12A and 12B, the electronic device 1200 (for example, the electronic device 101 of FIG. 1) may include a housing 210. According to an embodiment, the housing 210 may be formed with a conductive member and/or a non-conductive member. According to an embodiment, the housing 210 may include a first surface 1201 (for example, a front surface or an upper surface) facing in a first direction (for example, an Z-axis direction), a second surface 1202 (for example, a rear surface or a lower surface) disposed in a direction opposite to the first surface 1201, and a side surface 1203 disposed to surround at least a portion of the first surface 1201 and the second surface 1202. According to an embodiment, the side surface 1203 may be formed by a side surface member 216 which couples a front surface plate 2011 and a rear surface plate 211, and includes metal and/or polymer. According to an embodiment, the electronic device 1200 may include the front surface plate 2011 (for example, a window or a glass plate) disposed on the first surface 1201, and a display 201 may be disposed to be exposed through the front surface plate 2011. According to an embodiment, the electronic device 1200 may include a receiver hole 202 for calling. According to an embodiment, the electronic device 1200 may be controlled to allow communication with the other person through the receiver hole 202 for calling by using a speaker device disposed therein. According to an embodiment, the electronic device 1200 may include a microphone hole 203. According to an embodiment, the electronic device 1200 may receive an external sound or may transmit a user's voice to the other person through the microphone hole 203 by using at least one microphone disposed inside the electronic device 1200 to detect a direction of a sound. According to an embodiment, the electronic device 1200 may include at least one key input device. According to an embodiment, the key input device may include at least one side key button disposed on the side surface member 216 of the housing 210.

According to various embodiments, the electronic device 1200 may include components which are exposed to the display 201, or perform functions through the front surface plate 2011 but are not exposed and perform various functions of the electronic device 1200. According to an embodiment, the components may include at least one sensor module 204. The sensor module 204 may include, for example, an illuminance sensor (for example, a light sensor), a proximity sensor (for example, a light sensor), an infrared sensor, an ultrasonic sensor, a fingerprint recognition sensor, a face recognition sensor, or an iris recognition sensor. According to an embodiment, the component may include a first camera device 205. According to an embodiment, the components may include an indicator 206 (for example, an LED device) for visually providing state information of the electronic device 1200 to the user. According to an embodiment, the component may include a light source 214 (for example, an infrared LED) disposed on one side of the receiver 202. According to an embodiment, the component may include an imaging sensor assembly 215 (for example, an iris camera) to detect an iris image when light generated from the light source 214 is irradiated onto the periphery of user's eyes. According to an embodiment, at least one of the components may be disposed to be exposed through at least a part of the second surface 1202 (for example, a rear surface or a back surface) facing in a direction (for example, -Z-axis direction) opposite to the first direction of the electronic device 1200.

According to various embodiments, the electronic device 1200 may include an external speaker hole 207. According to an embodiment, the electronic device 1200 may emit a sound through the external speaker hole 207 by using a speaker disposed therein. According to an embodiment, the electronic device 1200 may include a first connector hole 208 (for example, an interface connector port) to perform a data exchange function with an external device and to receive external power to charge the electronic device 1200. According to an embodiment, the electronic device 1200 may include a second connector hole 209 (for example, an earphone jack assembly) to receive an earphone jack of an external device.

According to various embodiments, the electronic device 1200 may include the rear surface plate 211 (for example, a rear surface window) disposed on the second surface 1202. According to an embodiment, the rear surface plate 211 may have a rear-facing camera device 212 disposed thereon. At least one electronic component 213 may be disposed on the periphery of the rear-facing camera device 212. According to an embodiment, the electronic component 213 may include at least one of an illuminance sensor (for example, a light sensor), a proximity sensor (for example, a light sensor), an infrared sensor, an ultrasonic sensor, a heartrate sensor, a fingerprint recognition sensor, or a flash device.

According to various embodiments, the electronic device 1200 may include at least one seal member for waterproofing. According to an embodiment, the speaker device may include at least one separation member to separate an external space and an internal space of the electronic device 1200. According to an embodiment, the electronic device may recognize immersion of the electronic device 1200 in water through at least one atmospheric pressure sensor, and may include a water-repellent structure which repels water remaining therein to the outside by operating the speaker device. Hereinafter, the electronic device with the water-repellent structure will be described in detail.

Figure 13:
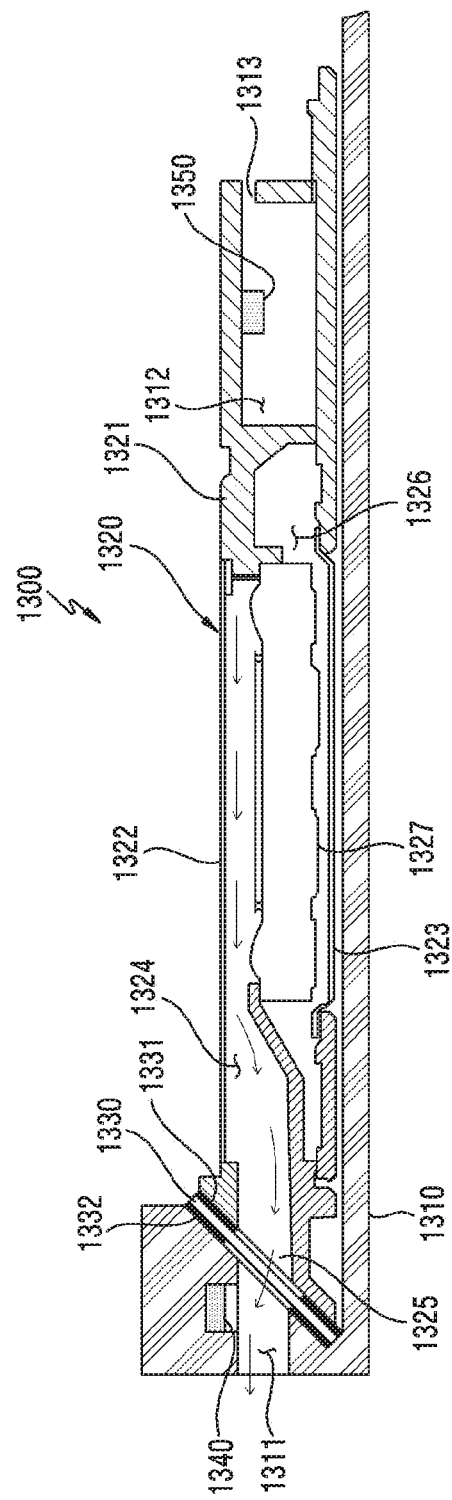
FIG. 13 is a cross-sectional view of a main part of the electronic device shown in FIG. 12A according to various embodiments of the disclosure.

FIG. 13 is a cross-sectional view of a main part of the electronic device shown in FIG. 12A according to various embodiments of the disclosure.

The electronic device 1300 of FIG. 13 may be similar to the electronic device 101 of FIG. 1, the electronic device 200 of FIG. 2, or the electronic device 1200 of FIG. 12A at least in part, or may include other embodiments of the electronic device.

Referring to FIG. 13, the electronic device 1300 (for example, the electronic device 101 of FIG. 1) may include a speaker module 1320 (for example, the sound output device 155 of FIG. 1) disposed in a housing 1310. According to an embodiment, the speaker module 1320 may include a speaker housing 1321 including at least one inner space.

According to an embodiment, the speaker housing 1321 may be disposed in the housing 1310 of the electronic device 1300. According to an embodiment, the speaker housing 1321 may include a first plate 1322 for opening and closing an upper opening, and a second plate 1323 for opening and closing a lower opening. According to an embodiment, the first, second plates 1322, 1323 may include a SUS plate. However, this should not be considered as limiting, and the speaker housing 1321 may be formed to have a space which is integrally sealed without the first, second plates. In this case, the speaker housing 1321 may be formed with a synthetic resin material by an injection molding process.

According to various embodiments, the speaker housing 1321 may include an opening 1325 adjacent to a first space 1311 (for example, a speaker hole) opened to the outside of the housing 560. According to an embodiment, the speaker housing 1321 may include a second space 1324 which interlocks with the opening 1325 and has a speaker device 1327 mounted therein. According to an embodiment, the speaker housing 1321 may include a third space 1326 partially separated from the second space 1324 to provide a sound pressure according to a mounting structure of the speaker device 1327. According to an embodiment, the electronic device 1300 may include a fourth space 1312 which is separated from the first, second spaces 1311, 1324 and is sealed from the outside. According to an embodiment, the third space 1326 and the fourth space 1312 may be formed to be spatially connected with each other.

According to various embodiments, the electronic device 1300 may include a separation member 1330 disposed to spatially separate the first space 1311 and the opening 1325 of the second space 1324 adjacent to the first space 1311. According to an embodiment, the separation member 1330 may include a mesh attached between the housing 1310 and the opening 1325 by fixing or adhesive members 1331, 1332. According to an embodiment, the adhesive member may include a double-sided tape and a sealing rubber. According to an embodiment, the mesh may block external water, and may discharge a sound emitted through the speaker device 1327 to the outside through the first space 1311.

According to various embodiments, the electronic device 1300 may include a first atmospheric pressure sensor 1340 disposed to be exposed to the first space 1311 connected with the outside. According to an embodiment, the first atmospheric pressure sensor 1340 may be disposed in the housing 1310 to be exposed to the first space 1311. According to an embodiment, the electronic device 1300 may include a second atmospheric pressure sensor 1350 disposed in the fourth space 1312 which is a sealed inner space. According to an embodiment, the first atmospheric pressure sensor 1340 may be configured to have a waterproof function. According to an embodiment, since the first atmospheric pressure sensor 1340 is disposed in the first space 1311 of the electronic device 1300 exposed to the outside, the first atmospheric pressure sensor may detect atmospheric pressure information immediately reflecting a state change of the electronic device 1300. According to an embodiment, the second atmospheric pressure sensor 1350 may be disposed in the fourth space 1312 sealed from the outside of the electronic device, and may detect internal atmospheric pressure of the electronic device 1300.

According to various embodiments, the electronic device 1300 may detect an immersion and/or immersion removal state of the electronic device 1300 by using the first, second atmospheric pressure sensors 1340, 1350 as in the above-described configuration, and may operate the speaker device 1327 to repel water based on the detected state information. In this case, water entering through the first space 1311, the opening 1325, and the second space 1324 may be discharged to the outside by pressure according to the operation of the speaker device 1327.

According to various embodiments, an electronic device (for example, the electronic device 400 of FIG. 4) may include: a housing (for example, the housing 410 of FIG. 4) including a first space (for example, the first space 411 of FIG. 4) connected with an outside of the electronic device; a speaker device (for example, the speaker device 421 of FIG. 4) disposed inside the housing; a speaker housing (for example, the speaker housing 420 of FIG. 4) including a second space (for example, the second space 412 of FIG. 4) formed to be spatially separated from an inner space for example, the inner space 413 of FIG. 4) of the electronic device by the speaker device inside the housing, and disposed to connect the second space to the first space; a first atmospheric pressure sensor (for example, the first atmospheric pressure sensor 430 of FIG. 4) disposed to be exposed to the first space, and having a waterproof function; a second atmospheric pressure sensor (for example, the second atmospheric pressure sensor 440 of FIG. 4) disposed in the inner space; and a processor, and the processor may be configured to detect immersion in water or immersion removal of the electronic device based on an atmospheric pressure change identified through the first atmospheric pressure sensor, and to control a water-repellent operation through the speaker device based on a difference value between first atmospheric pressure information obtained from the first atmospheric pressure sensor and second atmospheric pressure information obtained through the second atmospheric pressure sensor.

According to various embodiments, the processor may be configured to provide a pressure toward the second space by a vibration of a diaphragm of the speaker device.

According to various embodiments, at least a portion of the housing may be coupled with the speaker housing to form the second space separated from the inner space.

According to various embodiments, the housing may further include at least one air inlet (for example, the air inlet 414 of FIG. 4) which is branched into the outside of the housing from the first space and/or the second space to allow external air to enter the first space and/or the second space from the outside.

According to various embodiments, the air inlet may be connected with at least one of a plurality of speaker holes formed on the housing of the electronic device.

According to various embodiments, the processor may be configured to determine immersion information related to the immersion in water and the immersion removal of the electronic device, based on the atmospheric pressure change detected through the first atmospheric pressure sensor, and to operate the speaker device according to the determined immersion information to repel water.

According to various embodiments, the processor may be configured to detect first atmospheric pressure information through the first atmospheric pressure sensor after the immersion removal, to detect second atmospheric pressure information through the second atmospheric pressure sensor, when the first atmospheric pressure information and the second atmospheric pressure information are not identical to each other, to operate the speaker device, and, when the first atmospheric pressure information and the second atmospheric pressure information are substantially equal to each other, to restrict the operating of the speaker device.

According to various embodiments, the processor may be configured to operate the speaker device in a non-audible frequency band.

According to various embodiments, the electronic device may further include a microphone device (for example, the microphone device 450 of FIG. 4) disposed in the inner space to collect a sound for detecting immersion outputted from the speaker device.

According to various embodiments, the processor may be configured to operate the speaker device until the sound for detecting immersion collected through the microphone matches a frequency corresponding to the immersion removal.

According to various embodiment, the electronic device may further include a display (for example, the display 311 of FIG. 3A), and the processor may be configured to output notification information related to the immersion and/or the immersion removal by using the display.

According to various embodiments, an operating method of an electronic device may include: identifying immersion in water through a first atmospheric pressure sensor disposed in a sound wave guide space connected with a speaker device of the electronic device to be exposed; identifying whether the immersion is removed through the first atmospheric pressure sensor when the immersion is identified; and discharging water remaining the sound wave guide space by operating the speaker device when the immersion is removed.

According to various embodiments, identifying the immersion may include identifying the immersion based on an atmospheric pressure change generated by a predetermined value or higher per unit time through the first atmospheric pressure sensor.

According to various embodiments, identifying the immersion removal may include identifying that the changed atmospheric pressure is restored to an atmospheric pressure through the first atmospheric pressure sensor.

According to various embodiments, the method may include: identifying whether first atmospheric pressure information of the first atmospheric pressure sensor and second atmospheric pressure information of a second atmospheric pressure sensor disposed in a sealed inner space of the electronic device are substantially identical to each other; and operating the speaker device until the difference of the first atmospheric pressure and second atmospheric pressure is substantially identical.

According to various embodiments, the method may include providing notification information through a display in response to the immersion and/or the immersion removal.

According to various embodiments, the method may include: when the immersion is removed, operating the speaker device by receiving a call; collecting a sound for detecting immersion through a microphone device during the operation of the speaker device; identifying whether the collected sound falls within a reference range corresponding to the immersion removal; and when the collected sound falls within the reference range, restricting the operation of the speaker device for water-repelling.

According to various embodiments, the method may include: after the immersion is removed, outputting a sound for detecting immersion through the speaker device; collecting the outputted sound for detecting immersion through a microphone device; identifying whether the collected sound falls within a reference range corresponding the immersion removal; and, when the collected sound falls within the reference range, stopping the operation of the speaker device for water-repelling.

According to various embodiments, the method may include outputting the sound for detecting immersion that has a non-audible frequency band through the speaker device.

According to various embodiments, the method may further include: detecting a current posture of the electronic device; and outputting information related to posture correction of the electronic device based on the detected posture.

Each of the elements described in the disclosure may be configured with one or more components, and the names of the elements may be changed according to the type of the electronic device. According to various embodiments, the electronic device may be configured to include at least one of the elements described in the disclosure, and some elements may be omitted or other additional elements may be added. Furthermore, some of the elements may be combined with each other so as to form one entity, and the functions of the elements may be performed in the same manner as before being combined.

The invention claimed is:

1. An electronic device comprising:
   a housing comprising a first space connected with an outside of the electronic device;
   a speaker device disposed inside the housing;
   a speaker housing comprising a second space formed to be spatially separated from an inner space of the electronic device by the speaker device inside the housing, and disposed to connect the second space to the first space;
   a first atmospheric pressure sensor disposed to be exposed to the first space, and having a waterproof function;
   a second atmospheric pressure sensor disposed in the inner space; and
   a processor,
   wherein the processor is configured to detect immersion in water or immersion removal of the electronic device based on an atmospheric pressure change identified through the first atmospheric pressure sensor, and to control a water-repellent operation through the speaker device based on a difference value between first atmospheric pressure information obtained from the first atmospheric pressure sensor and second atmospheric pressure information obtained through the second atmospheric pressure sensor.

2. The electronic device of claim 1, wherein the processor is configured to provide a pressure toward the second space by a vibration of a diaphragm of the speaker device.

3. The electronic device of claim 1, wherein at least a portion of the housing is coupled with the speaker housing to form the second space separated from the inner space.

4. The electronic device of claim 1, wherein the housing further comprises at least one air inlet which is branched into the outside of the housing from the first space and/or the second space to allow external air to enter the first space and/or the second space from the outside, and
   wherein the air inlet is connected with at least one of a plurality of speaker holes formed on the housing of the electronic device.

5. The electronic device of claim 1, wherein the processor is configured to determine immersion information related to at least one of the immersion in water and the immersion removal of the electronic device, based at least on the atmospheric pressure change detected through the first atmospheric pressure sensor, and to repel water by driving the speaker device according to the determined immersion information.

6. The electronic device of claim 5, wherein the processor is configured to:
- detect the first atmospheric pressure information through the first atmospheric pressure sensor after the immersion removal,
- detect the second atmospheric pressure information through the second atmospheric pressure sensor,
- when the first atmospheric pressure information is not substantially equal to the second atmospheric pressure information, operate the speaker device.

7. The electronic device of claim 6, wherein, when the first atmospheric pressure information is substantially equal to the second atmospheric pressure information, the processor is configured to restrict operating the speaker device in a non-audible frequency band.

8. The electronic device of claim 1, further comprising a microphone disposed in the inner space to collect a sound for detecting immersion outputted from the speaker device,
- wherein the processor is configured to operate the speaker device until the sound for detecting immersion collected through the microphone matches a frequency corresponding to the immersion removal.

9. An operating method of an electronic device, the method comprising:
- identifying immersion in water through a first atmospheric pressure sensor disposed in a sound wave guide space having one end connected with a speaker of the electronic device and having another end externally exposed;
- identifying whether the immersion is removed through the first atmospheric pressure sensor, after the immersion is identified; and
- discharging water remaining in the sound wave guide space by operating the speaker when the immersion is removed,
- wherein the speaker is operated until the first atmospheric pressure is substantially identical to a second atmospheric pressure, and
- wherein a second atmospheric pressure sensor configured to detect the second atmospheric pressure is disposed in a sealed inner space of the electronic device.

10. The method of claim 9, wherein identifying the immersion comprises identifying the immersion based on an atmospheric pressure change generated by a predetermined value or higher per unit time through the first atmospheric pressure sensor, and
- wherein identifying the immersion removal comprises identifying that the changed atmospheric pressure is restored to an atmospheric pressure through the first atmospheric pressure sensor.

11. The method of claim 9, comprising:
- when the immersion is removed, operating the speaker;
- collecting a sound for detecting immersion through a microphone device during the operation of the speaker;
- identifying whether the collected sound falls within a reference range corresponding to the immersion removal; and
- when the collected sound falls within the reference range, restricting the operation of the speaker for water-repelling.

12. The method of claim 9, comprising:
- after the immersion is removed, outputting a sound for detecting immersion through the speaker;
- collecting the outputted sound for detecting immersion through a microphone device;
- identifying whether the collected sound falls within a reference range corresponding the immersion removal; and
- when the collected sound falls within the reference range, restricting the operation of the speaker for water-repelling.

13. The method of claim 12, comprising outputting the sound for detecting immersion that has a non-audible frequency band through the speaker.

14. The method of claim 9, further comprising:
- detecting a current posture of the electronic device; and
- outputting information related to posture correction of the electronic device based on the detected posture.

* * * * *